US011720165B2

(12) United States Patent
Chen

(10) Patent No.: US 11,720,165 B2
(45) Date of Patent: Aug. 8, 2023

(54) MULTI-PARTY LOCATION-BASED VR SHARED SPACE USAGE OPTIMIZATION

(71) Applicant: Comcast Cable Communications, LLC, Philadelphia, PA (US)

(72) Inventor: Michael Chen, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 240 days.

(21) Appl. No.: 17/212,017

(22) Filed: Mar. 25, 2021

(65) Prior Publication Data
US 2022/0308654 A1  Sep. 29, 2022

(51) Int. Cl.
G09G 5/00 (2006.01)
G06F 3/01 (2006.01)
G06T 7/73 (2017.01)
A63F 13/847 (2014.01)
A63F 13/21 (2014.01)
A63F 13/40 (2014.01)

(52) U.S. Cl.
CPC ............. G06F 3/011 (2013.01); A63F 13/21 (2014.09); A63F 13/40 (2014.09); A63F 13/847 (2014.09); G06T 7/73 (2017.01); A63F 2300/8082 (2013.01)

(58) Field of Classification Search
CPC .......... G06F 3/011; A63F 13/21; A63F 13/40; A63F 13/847; A63F 2300/8082; G06T 7/73
USPC ......................... 345/156, 161, 167, 157, 505
See application file for complete search history.

(56) References Cited

U.S. PATENT DOCUMENTS

| 2015/0310041 | A1* | 10/2015 | Kier | ................. | A63F 13/213 |
| | | | | | 463/33 |
| 2018/0088886 | A1* | 3/2018 | Virodov | ................. | G06F 1/163 |
| 2018/0091856 | A1 | 3/2018 | Ayers et al. | | |
| 2019/0188475 | A1* | 6/2019 | McAdory | ................. | G06V 20/20 |
| 2019/0250869 | A1* | 8/2019 | Virodov | ................. | G09G 3/003 |
| 2020/0084564 | A1* | 3/2020 | Mindlin | ................. | H04S 3/008 |
| 2020/0334912 | A1* | 10/2020 | Antypov | ................. | G06T 19/006 |
| 2020/0349539 | A1* | 11/2020 | Dent | ................. | G07F 19/201 |
| 2021/0158620 | A1* | 5/2021 | Saraf | ................. | H04W 48/08 |
| 2021/0279949 | A1* | 9/2021 | Cao | ................. | G06F 3/012 |
| 2021/0279953 | A1* | 9/2021 | Bouhnik | ................. | G06T 15/005 |
| 2021/0373662 | A1* | 12/2021 | Pratt | ................. | G06F 3/011 |

(Continued)

OTHER PUBLICATIONS

Hesch, Joel, Kozminski, Anna, and Linde, Oskar. "Powered by AI: Oculus Insight". AR/VR: Computer Vision. Aug. 22, 2019. https://ai.facebook.com/blog/powered-by-ai-oculus-insight/.

(Continued)

Primary Examiner — Thuy N Pardo
(74) Attorney, Agent, or Firm — Banner & Witcoff, Ltd.

(57) ABSTRACT

Methods, systems, and apparatuses are described for providing XR experiences to multiple users. A plurality of XR devices might participate in a group XR experience. Physical environment data may be determined for each XR device. Virtual play areas for each of the XR devices may be determined. The different virtual play areas may be fit into different areas of a predefined virtual play area, and/or may be combined to form a combined virtual play area. Each XR device might be provided a different portion of the virtual play area. The XR devices may be sent different virtual map positioning data to provide the group XR experience.

29 Claims, 13 Drawing Sheets

(56) References Cited

U.S. PATENT DOCUMENTS

| | | | |
|---|---|---|---|
| 2022/0165037 A1* | 5/2022 | Zavesky | H04N 23/60 |
| 2022/0279601 A1* | 9/2022 | Xue | H04W 74/0883 |
| 2022/0279602 A1* | 9/2022 | Xue | G06T 11/00 |
| 2022/0383027 A1* | 12/2022 | Polavarapu | G06F 18/22 |

OTHER PUBLICATIONS

Jaki, Andreas. "Basics of AR: SLAM—Simultaneous Localization and Mapping". Aug. 14, 2018. https://www.andreasjakl.com/basics-of-ar-slam-simultaneous-localization-and-mapping/.

Wilson, Mark. "In the home of the future, every surface is an interface". Jan. 22, 2020. https://www.fastcompany.com/90453867/in-the-home-of-the-future-every-surface-is-an-interface.

Zhi-Chao Dong, Xiao-Ming Fu, Zeshi Yang, and Ligang Liu. "Redirected Smooth Mappings for Multiuser Real Walking in Virtual Reality". University of Science and Technology of China. ACM Transactions on Graphics, 38(5), 2019. http://staff.ustc.edu.cn/~fuxm/projects/REM/index.html.

Misha Sra, Aske Mottelson, and Pattie Maes. "Your Place and Mine: Designing a Shared VR Experience for Remotely Located Users". DIS '18, Jun. 9-13, 2018,, Hong Kong. DOI: https://doi.org/10.1145/3196709.3196788.

"Confirming Your Height in VR". IRIS VR: Part of the Wild, https://help.irisvr.com/hc/en-us/articles/216058907-Confirming-Your-Height-in-VR.

Vrije Universiteit Amsterdam. "Effective fear of heights treatment without a therapist using virtual reality, study suggests." ScienceDaily. ScienceDaily, Mar. 25, 2019. <www.sciencedaily.com/releases/2019/03/190325110324.htm>.

Todd Martens. "If it weren't for virtual reality games, I wouldn't be getting exercise right now". Apr. 26, 2020. https://www.latimes.com/entertainment-arts/story/2020-04-26/coronavirus-virtual-reality-fitness-exercise-work-outs.

John Koetsier. "VR Fitness Is Exercise Without Effort, According to Science". Jul. 2, 2020. https://www.forbes.com/sites/johnkoetsier/2020/07/02/vr-fitness-is-exercise-without-effort-according-to-science/?sh=2ea4481c433e.

Steam Powered: Steam Support. https://help.steampowered.com/en/faqs/view/6B1A-66BE-E911-3D98. 2022.

Mark Roman Miller, Fernanda Herrera, Hanseul Jun, James A. Landay & Jeremy N. Bailenson. "Personal identifiability of user tracking data during observation of 360-degree VR video". Published: Oct. 15, 2020. https://www.nature.com/articles/s41598-020-74486-y.

* cited by examiner

|  | Available Virtual Play Area Size (802a) | Seated or Standing (802b) | Motion Controls? (802c) | Assigned Role (803) |
|---|---|---|---|---|
| User 1 (801a) | 2m² | Standing | Y | Soldier |
| User 2 (801b) | 1m² | Standing | N | Engineer |
| User 3 (801c) | 0.5m² | Seated | Y | Sniper |

FIG. 8A

|  | Minimum Area Size (805a) | Seated? (805b) | Standing? (805c) | Motion Controls Required? (805d) |
|---|---|---|---|---|
| Soldier (804a) | 1m² | N | Y | Y |
| Engineer (804b) | 0.75m² | Y | Y | N |
| Sniper (804c) | 0.5m² | Y | Y | N |

We have detected that you are in a 2m² room with a couch, a chair, and a desk. What role would you like to play?

| |
|---|
| Soldier (Standing Role)<br>(903a) |
| Engineer (Standing Role, Requires Moving Chair)<br>(903b) |
| Commander (Seated Role)<br>(903c) |

Menu
(901)

We have detected that you have a couch in your room. Would you like to use it?

| |
|---|
| Yes (Couch will be used during gameplay)<br>(906a) |
| No (Couch will not be used during gameplay – roles limited)<br>(906b) |

Menu
(904)

FIG. 9B

MULTI-PARTY LOCATION-BASED VR SHARED SPACE USAGE OPTIMIZATION

BACKGROUND

Extended reality (XR) environments (e.g., virtual reality environments, mixed reality environments, and augmented reality environments) are becoming increasingly popular for a variety of uses cases, such as for gaming, industrial design, and remote learning. In some cases, a plurality of users (which might additionally and/or alternatively be referred to as participants or users) may, using different XR devices, participate in a single group XR experience. For example, two different users might participate in an XR video game by using two different XR devices. Because the two users might not be in the same location (and, e.g., might be in different locations, such as in different rooms, different apartments, or the like), it may be difficult to provide a consistent and enjoyable XR experience for both users, particularly given that the users might be in significantly different physical environments with different objects impeding their movement. For example, one user might have a significantly larger physical environment than another user. As another example, one user might be in a physical environment with a couch that may be used for seated gameplay, whereas another user might be in an empty physical environment (e.g., an empty room). As another example, two users might be in different locations of the same room, such that each user is closer to (and might accidentally walk into) different nearby furniture.

SUMMARY

The following summary presents a simplified summary of certain features. The summary is not an extensive overview and is not intended to identify key or critical elements.

Methods, systems, and apparatuses are described for providing XR experiences to multiple users, particularly where such users might be in different physical environments. Information indicating different physical layouts of environments associated with a plurality of XR devices for participation in a group XR experience may be received. The different physical layouts might be fit into different areas of a virtual map, such that each user might be assigned a different portion of the virtual map. Different virtual map positioning data to provide the group XR experience may be sent to the XR devices and based on the fitting. The XR devices may be configured to provide, based on the different virtual map positioning data, different perspectives of the group XR experience.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 8A shows an example chart of assigned user roles.
FIG. 8B shows requirements for different user roles.
FIG. 9A shows an example menu for selecting a user role.
FIG. 9B shows an example menu for using objects in a physical environment.

DETAILED DESCRIPTION

Figure 1:
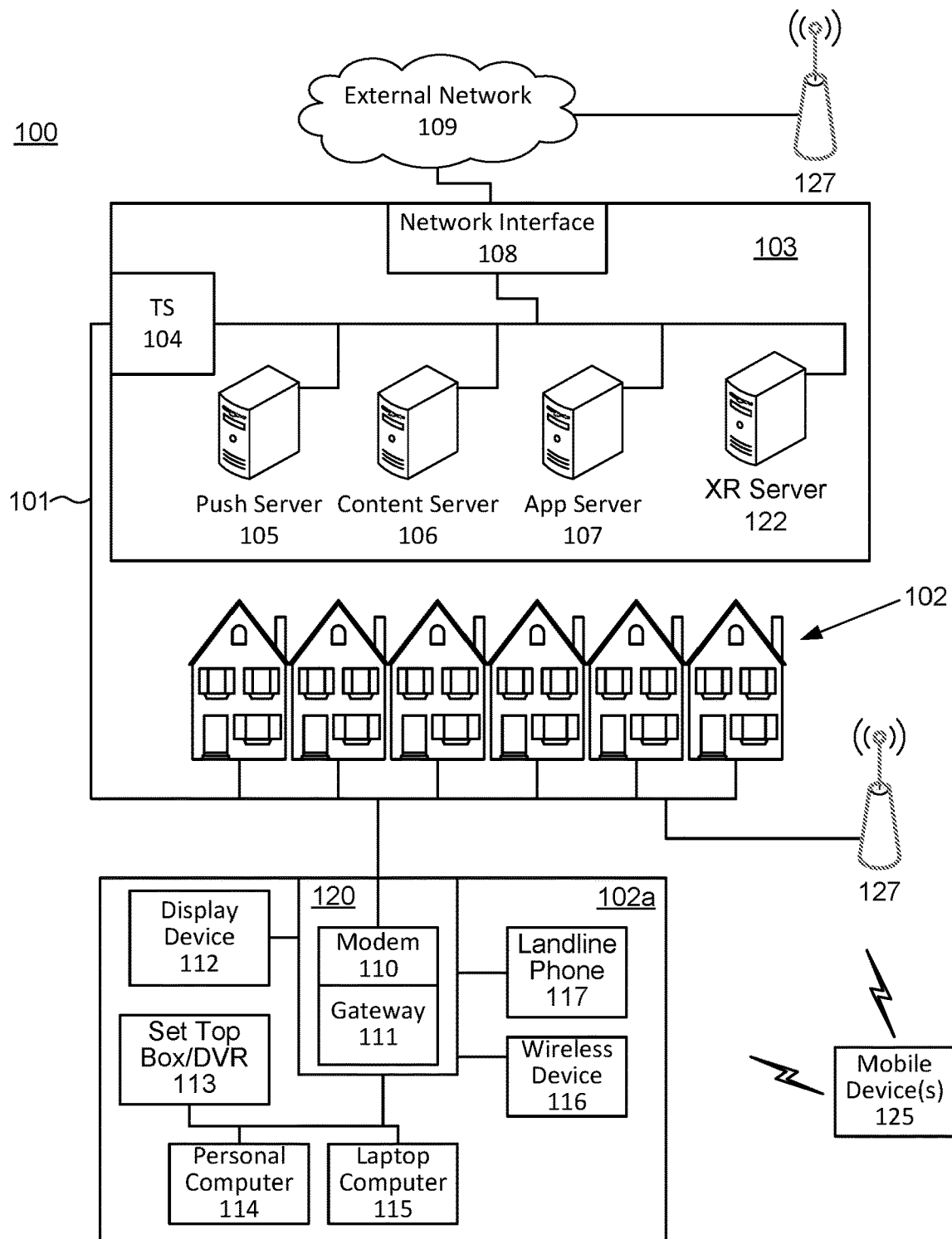
FIG. 1 shows hardware elements of a computing device.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104, such as a termination system (TS). The interface 104 may comprise a cable modem termination system (CMTS) and/or other computing device(s) configured to send information downstream to, and to receive information upstream from, devices communicating with the local office 103 via the communications links 101. The interface 104 may be configured to manage communications among those devices, to manage communications between those devices and back-end devices such as servers 105-107 and 122, and/or to manage communications between those devices and one or more external networks 109. The local office 103 may comprise one or more network interfaces 108 that comprise circuitry needed to communicate via the external networks 109. The external networks 109 may comprise networks of Internet devices, telephone networks, wireless networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, such as the XR server 122 (described below), additional push, content, and/or application servers, and/or other types of servers. Although shown separately, the push server 105, the content server 106, the application server 107, the XR server 122, and/or other server(s) may be combined. The servers 105, 106, 107, and 122, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), phones 117 (e.g. Voice over Internet Protocol—VoIP phones), XR devices (e.g., XR headsets, mobile phones, tablets), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
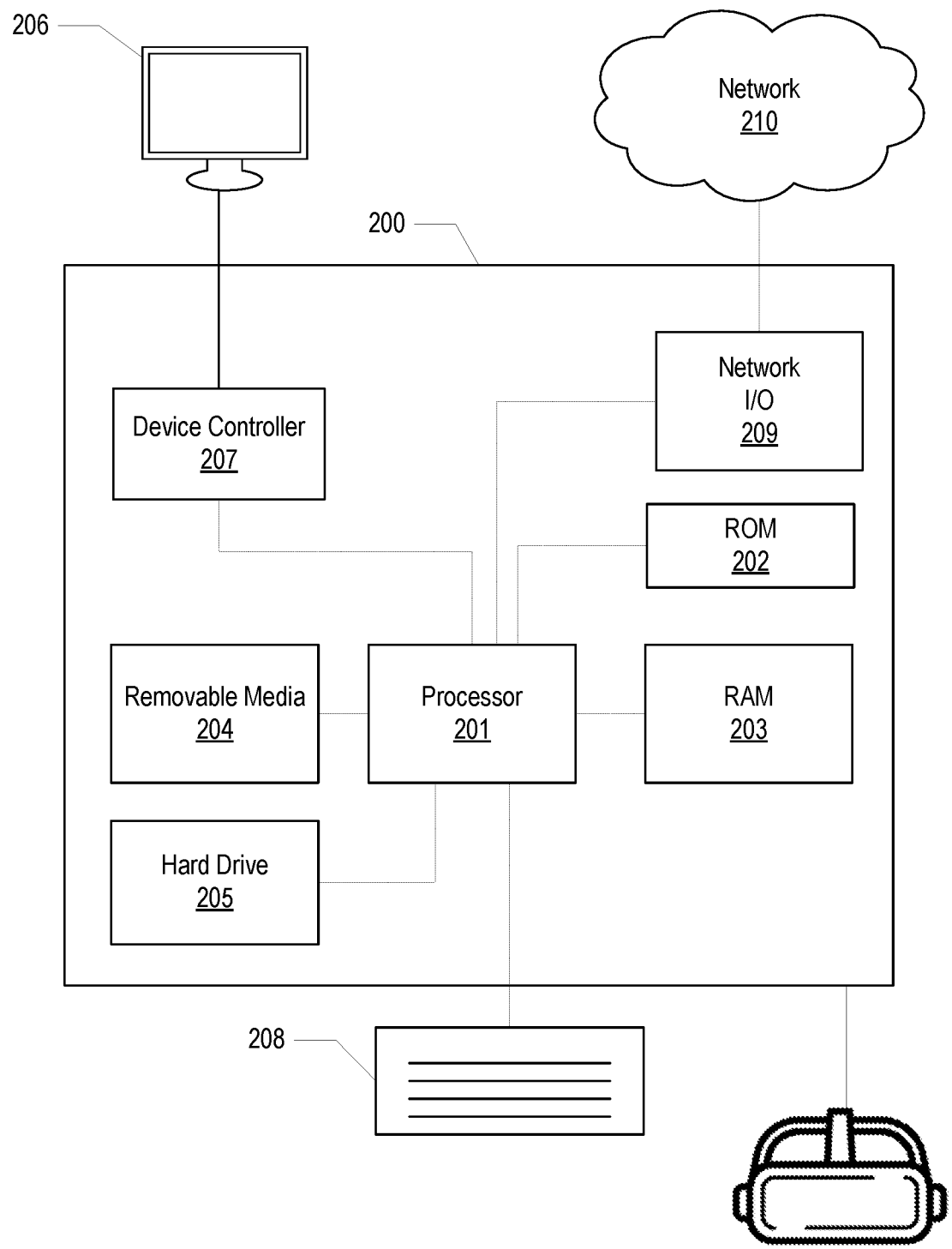
FIG. 2 shows an example of an XR device.

FIG. 2 shows hardware elements of a computing device 200 that may be used to implement any of the computing devices shown in FIG. 1 (e.g., any of the devices shown in the premises 102a) and any other computing devices discussed herein. The computing device 200 may comprise one or more processors 201, which may execute instructions of a computer program to perform any of the functions described herein. The instructions may be stored in a read-only memory (ROM) 202, random access memory (RAM) 203, removable media 204 (e.g., a USB drive, a compact disk (CD), a digital versatile disk (DVD)), and/or in any other type of computer-readable medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 209 (e.g., a network card) to communicate with an external network 210. The network I/O interface 209 may be a wired interface (e.g., electrical, RF (via coax), optical (via fiber)), a wireless interface, or a combination of the two. The network I/O interface 209 may comprise a modem configured to communicate via the external network 210. The external network 210 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may be communicatively coupled to a XR device, such as XR device 211. As will be described in more detail below with respect to FIG. 3, the XR device 211 may be configured to provide an XR environment to a user.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3:
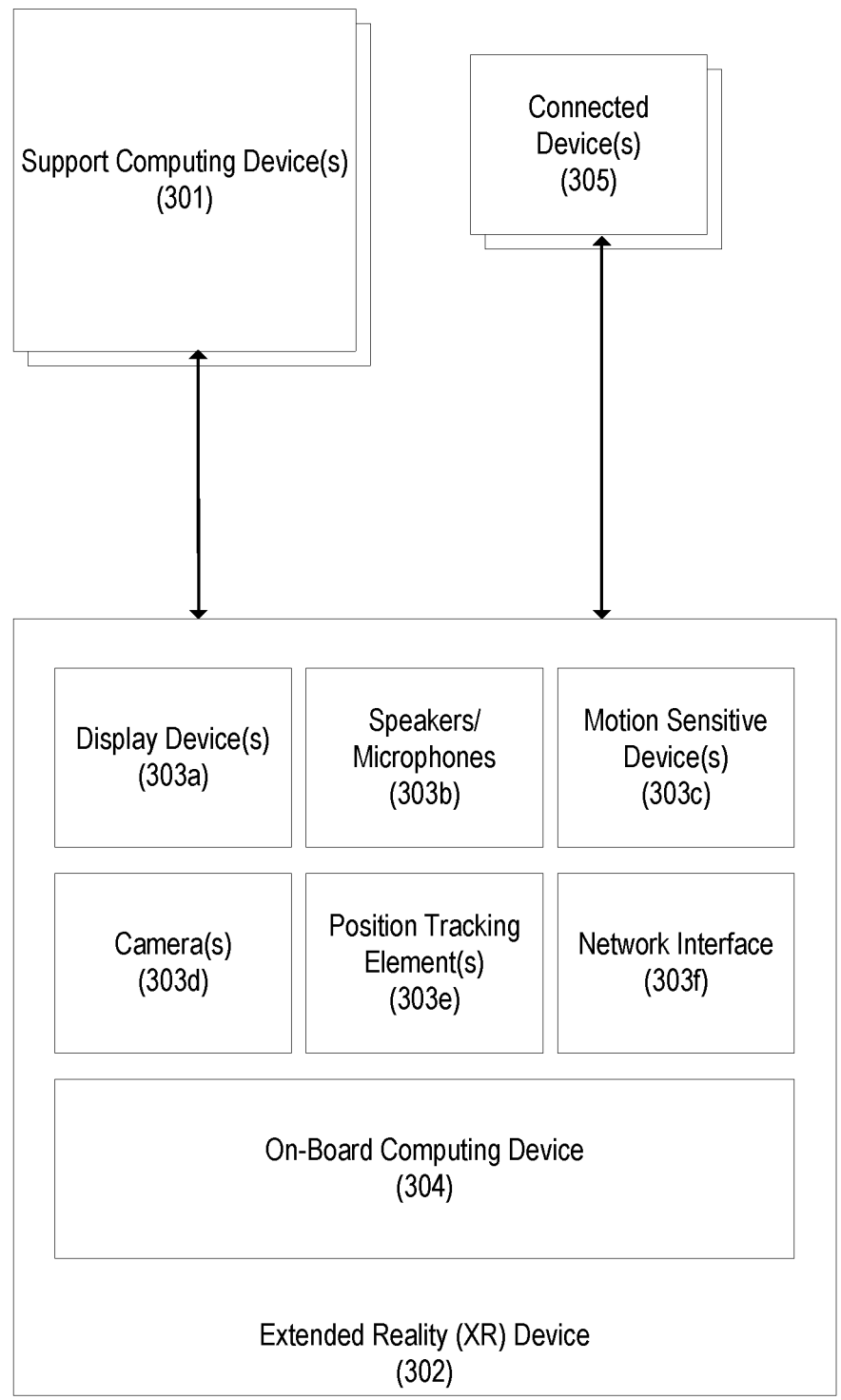
FIG. 3 shows an example communication network.

FIG. 3 depicts an example of an extended reality (XR) device 302, which may be the same or similar as the XR device 211. The XR device 302 may comprise and/or may be communicatively connected to an on-board computing device 304, which may be the same or similar as the computing device 200. The XR device 302 may include a plurality of different elements, such as display devices 303a, speakers/microphones 303b, motion sensitive devices 303c (e.g., accelerometers, gyroscopes, compasses, and other elements as discussed further below), cameras 303d, position tracking elements 303e, and network interface 303f (e.g., wireless and/or wired communication circuitry and the like, as will be discussed further below). The speakers/microphones 303b, motion sensitive devices 303c, cameras 303d, position tracking elements 303e, and/or the network interface 303f may additionally and/or alternatively be referred to as sensors. Other such elements, not shown, may include in-ear electroencephalographic (EEG) and/or heart rate variability (HRV) measuring devices, scalp and/or forehead-based EEG and/or HRV measurement devices, eye-tracking devices (e.g., using infrared), or the like. The XR device 302 may further include support computing device(s) 301, which may be the same or similar as the computing device 200. Not all elements shown in FIG. 3 need to be present for operation of the XR device 302. For example, the XR device 302 might not have the cameras 303d. As another example, the XR device 302 might lack any of the support computing device(s) 301, such that the on-board computing device 304 directly interfaces with the display devices 303a, the speakers/microphones 303b, the motion sensitive devices 303c, the cameras 303d, the position tracking elements 303e, and/or the network interface 303f to provide an XR environment. As another example, the support computing device(s) 301 may be sufficiently powerful enough such that the on-board computing device 304 may be omitted or simplified. The support computing device(s) may be communicatively coupled (e.g., over a network, such as the network 110) to biometric tracking device(s) 305 and database(s) 306.

The on-board computing device 304 and/or the support computing device(s) 301 might not have any particular processing power or functionality to render (and, e.g., display to a user) an extended reality environment. The on-board computing device 304 and/or the support computing device(s) 301 may include, for example, relatively under-powered processors which provide rudimentary video and/or audio. For example, support computing device(s) 301 might handle graphics processing and then transmit, to the on-board computing device 304, results of the processing for display. In such an example, the support computing device(s) 301 might be substantially more computationally powerful as compared to the on-board computing device 304. Additionally and/or alternatively, such graphics processing might be performed by the on-board computing device 304, with the support computing device(s) 301 providing other functions (e.g., retrieving content, such as applications, from the Internet and transmitting the content to the on-board computing device 304). The on-board computing device 304 and/or the support computing device(s) 301 may, for example, include relatively powerful processors which provide highly realistic video and/or audio.

The XR device 302 may provide an XR (e.g., a virtual, augmented, and/or mixed reality) environment to a user (e.g., a player of an XR game). In general, virtual reality environments may provide an environment which is intended to entirely replace the real world (and, e.g., replaces all of a user's field of view with display of a virtual environment), whereas augmented reality and/or mixed reality environments might provide an environment which displays both real-world and simulated elements (by, e.g., replacing only a portion of a user's field of view with display of virtual objects, and/or by reproducing a video feed of the real world in a simulated environment). For example, an augmented reality system might use cameras to capture video of a physical area surrounding a user and then super-impose computer-generated images on top of that captured video. The XR device 302 may be a device specifically configured to provide an extended reality environment (e.g., an extended reality headset), or may be a combination of devices (e.g., a smartphone inserted into and/or communicatively coupled to a headset) which, when operated in a particular manner, provides an extended reality environment. The XR device 302 may be said to be untethered at least in part because it may lack a physical connection to another device (and, e.g., may be battery powered). If the XR device 302 is physically connected to another device (e.g., the support computing device(s) 301, a power source, or the like), it may be said to be tethered. Examples of the XR device 302 may include the VALVE INDEX virtual reality device developed by Valve Corporation of Bellevue, Wash., the OCULUS QUEST virtual reality device sold by Facebook Technologies, LLC of Menlo Park, Calif., and the HTC VIVE virtual reality device sold by HTC Corporation of New Taipei City, Taiwan. Examples of the XR device 302 may also include smartphones which may be placed into a headset for extended reality purposes, such as the GEAR VR product sold by Samsung Group of Seoul, South Korea. Examples of the XR device 302 may also include augmented and/or mixed reality devices, such as the headsets sold by Magic Leap, Inc. of Plantation, Fla., the HOLOLENS headsets sold by Microsoft Corporation of Redmond, Wash., and NREAL LIGHT headsets sold by Hangzhou Tairuo Technology Co., Ltd. of Beijing, China, among others. Examples of the XR device 302 may also include audio-based devices, such as the ECHO FRAMES sold by Amazon, Inc. of Seattle, Wash. All such extended reality devices may have different specifications. For example, some extended reality devices may have cameras, whereas others might not. These are merely examples, and other XR devices may also or alternatively be used. Moreover, either or both the on-board computing device 304 and/or the support computing device(s) 301 may perform the steps described herein. Accordingly, the disclosure herein may be performed exclusively by the on-board computing device 304 (e.g., such that the XR device 302 is untethered), by the support computing device(s) 301 (e.g., such that the XR device 302 is tethered to a computing device, such as in a laboratory setting), and/or a combination thereof (e.g., such that the on-board computing device 304 performs some steps described herein, the support computing device(s) 301 perform other steps described herein, and the devices collectively perform all steps described herein).

The support computing device(s) 301 may provide all or portions of an extended reality environment to the XR device 302, e.g., as used by a tethered OCULUS RIFT. For example, the support computing device(s) 301 may provide a video data stream to the XR device 302 that, when displayed by the XR device 302 (e.g., through the display devices 303a), shows a virtual world. Such a configuration may be advantageous where the XR device 302 (e.g., the on-board computing device 304 that is part of the XR device 302) is not powerful enough to display a full extended reality environment. The support computing device(s) 301 need not be present for the XR device 302 to provide an extended reality, augmented reality, and/or mixed reality environment. For example, where the on-board computing device 304 is sufficiently powerful, the support computing device(s) 301 may be omitted (or, alternatively, to be considered to have been implemented within on-board computing device 304), e.g., an untethered OCULUS QUEST.

The display devices 303a may be any devices configured to display all or portions of an extended reality environment. Such display devices 303a may include, for example, flat panel displays, such as one or more liquid-crystal display (LCD) panels. The display devices 303a may be the same or similar as the display 206. The display devices 303a may be singular or plural, and may be configured to display different images to different eyes of a user. For example, the display devices 303a may include one or more display devices coupled with lenses (e.g., Fresnel lenses) which separate all or portions of the displays for viewing by different eyes of a user.

The speakers/microphones 303b may be any devices which may receive and/or output audio associated with an extended reality environment. For example, the speakers/microphones 303b may include speakers which direct audio towards the ears of a user. As another example, the speakers/microphones 303b may include one or more microphones which receive voice input from a user. The speakers/microphones 303b may be used to provide an audio-based extended reality environment to a user of the XR device 302.

The motion sensitive devices 303c may be any elements which receive input related to the motion of a user of the XR device 302. For example, the motion sensitive devices 303c may include one or more accelerometers which may detect when a user of the extended reality device is moving (e.g., leaning, moving forward, moving backwards, turning, or the like). Three dimensional accelerometers and/or gyroscopes may be used to detect full motion of the XR device 302. Optional external facing cameras 303d may be used for 3D orientation as well. The motion sensitive devices 303c may permit the XR device 302 to present an extended reality environment which changes based on the motion of a user. The motion sensitive devices 303c might work in conjunction with the position tracking elements 303e to detect motion of a user. For example, the position tracking elements 303e might provide positioning data which might, in conjunction with movement data collected by the motion sensitive devices 303c, be used to determine a location of a user in a room and how movement by the user (e.g., a step forward) affects their location within the room. Such collective work by the motion sensitive devices 303c and the position tracking elements 303e may advantageously allow the XR device 302 to detect finer detail motions and to avoid incorrectly predicting the motion of a user when data from either or both of the sensors is unclear.

The cameras 303d may be used to aid in the safety of the user as well as the presentation of an extended reality environment. The cameras 303d may be used to monitor the surroundings of a user. For example, the cameras 303d may be configured to detect one or more elements of an environment of the user (e.g., walls, chairs, or the like). Using the output from the cameras 303d, the XR environment might be configured to display a bounding box so as to discourage the user from inadvertently contacting elements (e.g., walls) in the real world. The cameras 303d may additionally and/or alternatively monitor the user (e.g., the eyes of the user, the focus of the user's eyes, the pupil dilation of the user, or the like) to determine which elements of an extended reality environment to render, the movement of the user in such an environment, or the like.

The cameras 303d may include visible light capture capabilities, as well as other abilities, such as infrared light capture capabilities. As such, the images captured by the cameras 303d might include information above and beyond color information. For example, the cameras 303d might comprise a depth-sensing camera that captures depth values in a field of view, and/or might comprise a camera configured to capture non-visible portions of the light spectrum.

The position tracking elements 303e may be any elements configured to aid in the tracking of the position and/or movement of the XR device 302. The position tracking elements 303e may be all or portions of a system of infrared emitters which, when monitored by a sensor, indicate the position of the XR device 302 (e.g., the position of the XR device 302 in a room). The position tracking elements 303e may be configured to permit "inside-out" tracking, where the XR device 302 tracks the position of one or more elements (e.g., the XR device 302 itself, a user's hands, external controllers, or the like) or "outside-in" tracking, where external devices aid in tracking the position of the one or more elements. For example, the position tracking elements 303e may be all or portions of Global Positioning System (GPS) circuitry configured to track a location of the XR device 302 in the world. The position tracking elements 303e may aid in determining a position of a user in both the real world (e.g., in a room) and in an extended reality environment. For example, a user might be simultaneously a first distance from a real-world object (e.g., a wall) and a second distance from an extended reality object (e.g., an avatar object).

Either or both the cameras 303d and/or the position tracking elements 303e may be used to determine properties of an environment about the XR device 302. For example, the cameras 303d may be configured to collect images of an environment about the XR device 302, and the position tracking elements 303e may be configured to determine a location of the XR device 302. Such information may be processed (e.g., by the on-board computing device 304 and/or the support computing devices 301) to determine a map of a physical environment about the XR device 302. In this manner, the support computing devices 301 and/or the on-board computing device 304 may be configured to determine a map of a surroundings of the XR device 302. Such a map may be particularly useful to, for example, determine an area where a user might be capable of moving.

The network interface 303f may be configured to receive and transmit data associated with an extended reality environment. For example, the network interface 303f may be configured to communicate data associated with movement of a user to the support computing device(s) 301. As another example, the network interface 303f may be configured to receive information associated with other users of a massively multiplayer extended reality environment.

The on-board computing device 304 may be configured to provide, via the display devices 303a, the speakers/microphones 303b, the motion sensitive devices 303c, the cameras 303d, the position tracking elements 303e, and/or the network interface 303f, the extended reality environment. The on-board computing device 304 may include one or more processors (e.g., a graphics processor), storage (e.g., that stores extended reality programs), or the like. In one or more arrangements, the on-board computing device 304 may be powerful enough to provide the extended reality environment without using the support computing device(s) 301, such that the support computing device(s) 301 might not be required and might not be connected to the XR device 302. In other configurations, the support computing device(s) 301 and the on-board computing device 304 may work in tandem to provide the extended reality environment. In other configurations, the XR device 302 might not have the on-board computing device 304, such that the support computing device(s) 301 interface with the display devices 303a, the speakers/microphones 303b, the motion sensitive devices 303c, the cameras 303d, the position tracking elements 303e, and/or the network interface 303f directly.

The above-identified elements of the XR device 302 are merely examples. The XR device 302 may have more or similar elements. For example, the XR device 302 may include in-ear EEG and/or HRV measuring devices, scalp and/or forehead-based EEG and/or HRV measurement devices, eye-tracking devices (e.g., using cameras directed at users' eyes, pupil tracking, infrared), or the like.

Discussion will now turn to how the XR device 302, the on-board computing device 304, and/or the support computing devices 301 may analyze physical play areas and fit (e.g., combine) those play areas into a virtual play area.

As a preliminary introduction of FIGS. 4A-4E, users of XR devices (e.g., the XR device 302) might have different physical environments in which they use the XR devices. For example, one user might play an XR game in their living room, while another might play the same XR game (and, e.g., in a multiplayer experience) in their home office. That said, both users might want to participate in a multiplayer XR experience and, e.g., participate in the same XR environment. The differences in the physical environments of each user may pose unique challenges. For example, one user might be able to walk in a broader area than another, meaning that one user might need to be discouraged from walking as much as another. As another example, both users might be in different locations in the same room, meaning that they might be near different furniture (and thus might not be able to both travel in the same direction at the same time). In particular, as shown in FIGS. 4A-4E, it might be desirable to apportion an available virtual play area to different users based on properties of their physical play areas.

Figure 4A:
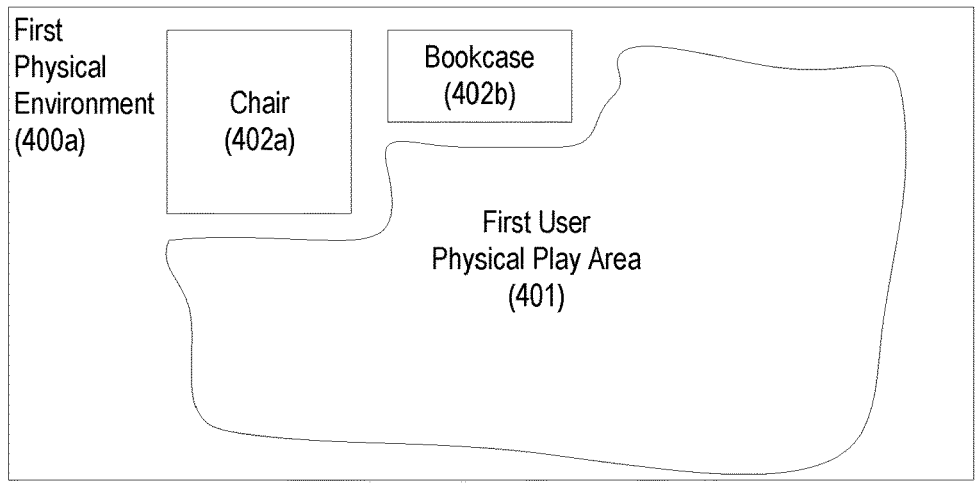
FIG. 4A shows an example first user physical play area.

FIG. 4A shows an example of a first user physical play area 401 in a first physical environment 400a. The first user physical play area 401 is shown as shaped around a chair 402a and bookcase 402b. The first user physical play area 401 may be shaped in a manner that represents an area of the first physical environment 400a where a user might walk or otherwise move. In some cases, the first user physical play area 401 might include furniture, particularly where that furniture might prevent the user from moving. For example, the first user physical play area 401 might include the chair 402a, particularly if a user might be capable of sitting in the chair 402a during an XR experience. That said, FIG. 4A depicts the circumstance where the first user physical play area 401 does not include areas of the first physical environment 400a occupied by the chair 402a and the bookcase 402b.

Figure 4B:
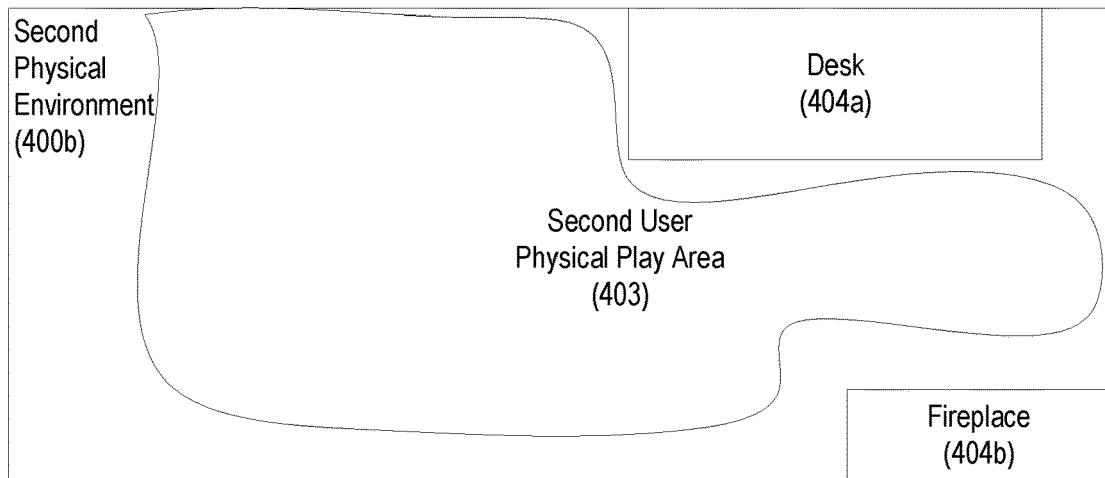
FIG. 4B shows an example second user physical play area.

FIG. 4B shows an example of a second user physical play area 403 in a second physical environment 400b. The second user physical play area 403 may be different from the first user physical play area 401, and the second physical environment 400b may be different from the first physical environment 400a. For example, the second physical environment 400b is depicted as being larger than the first physical environment 400a, and as having different furniture as compared to the first physical environment 400a. The second user physical play area 403 does not include portions of the second physical environment 400b occupied by a desk 404a and a fireplace 404b.

Figure 4C:
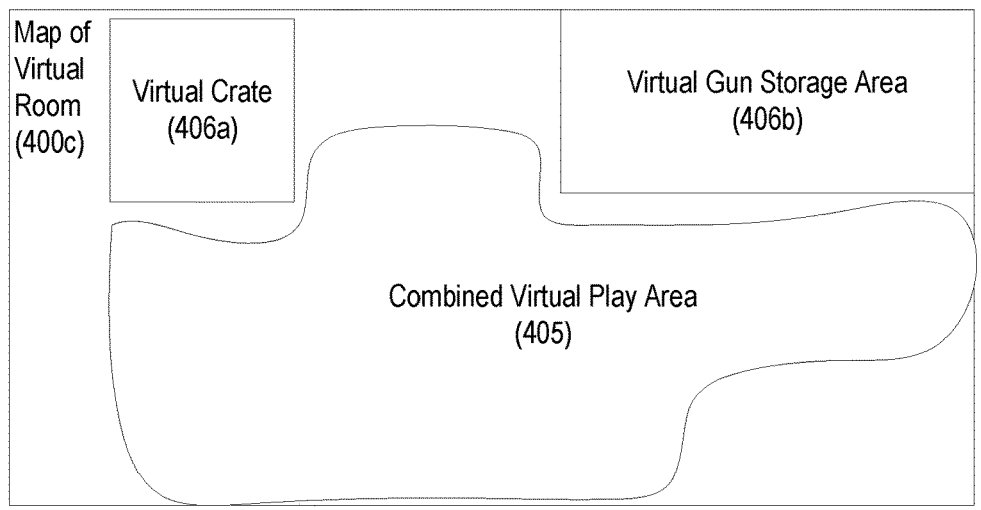
FIG. 4C shows an example virtual play area.

FIG. 4C shows an example of a combined virtual play area 405 in a map of a virtual room 400c. The virtual room 400c need not have any similarity to the rooms discussed in FIGS. 4A-4B. For example, the virtual room 400c might be a virtual battlefield. The virtual room 400c is shown having a virtual crate 406a and a virtual gun storage area 406b. Details about a virtual room, such as the virtual room 400c, may be specified by a map that is stored by a computing device. For example, a map might specify that a virtual room is to comprise a crate (e.g., the virtual crate 406a) and a gun storage area (e.g., the virtual gun storage area 406b), as well as the locations of both the crate and the gun storage area. The map might specify which objects are interactable, such as an indication that a user might interact with the gun storage area to receive a virtual item, such as a weapon. The combined virtual play area 405 may be defined as an area within which both users may move in an XR experience. For example, the combined virtual play area 405 may correspond to all portions of a map in which one or more users may travel. The combined virtual play area 405 of FIG. 4C represents areas in which either or both users may move, and its borders might be defined by physical objects such as the chair 402a, the bookcase 402b, the desk 404a, and/or the virtual gun storage area 406b. In turn, areas of the map of the virtual room 400c occupied by the virtual crate 406a and/or the virtual gun storage area 406b might not be traversable by any user. That said, in some circumstances, objects in the environment might permit interaction by a user. For example, a user might be capable of sitting in the virtual crate 406a by sitting in a corresponding chair in their physical environment (e.g., the chair 402a in the first physical environment 400a). In such an example, the first user physical play area 401 might include the area occupied by the chair 402a.

Figure 4D:
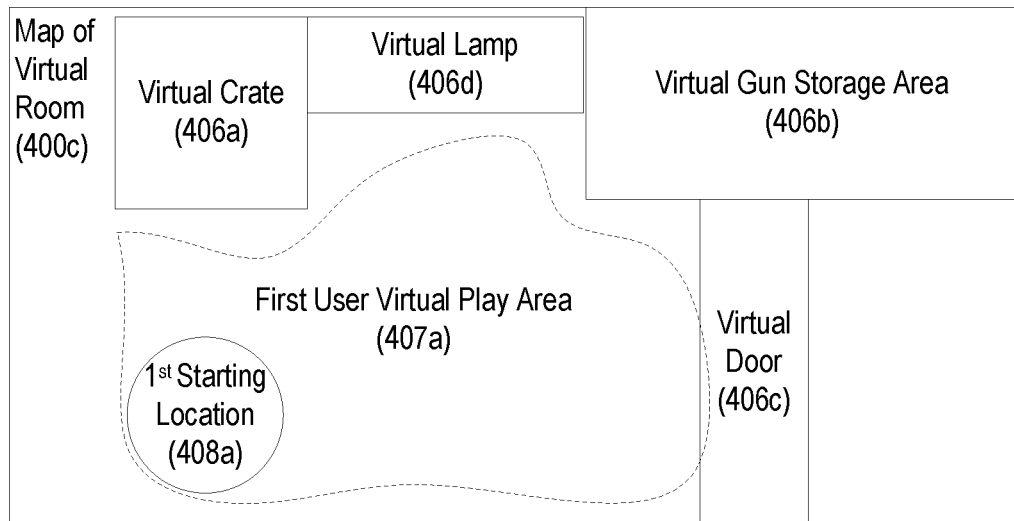
FIG. 4D shows an example first user virtual play area.

After a combined virtual play area 405 has been determined, the users (e.g., the first user shown in the example provided by FIG. 4A and the second user shown in the example provided by FIG. 4B) might be assigned all or portions of the combined virtual play area 405. FIG. 4D shows an example including a first user virtual play area 407*a*, in the virtual room 400*c*, that includes a first starting location 408*a*. The first user virtual play area 407*a* may be a virtual play area that is based on the first user physical play area 401. For example, the first user virtual play area 407*a* may correspond to a portion of the combined virtual play area 405 that has been allocated for a first user based on the first user physical play area. The first starting location 408*a* corresponds to a portion of the first user virtual play area 407*a* where a user might begin an XR experience. In this example, when the first user begins an XR experience in the virtual room 400*c*, they might be positioned from the first starting location 408*a*, such that the perspective of the virtual room 400*c* is rendered from that position.

Throughout this disclosure, virtual play areas, such as the combined virtual play area 405, are depicted as simplified two-dimensional maps for simplicity. That said, the virtual play areas need not be limited in any particular manner, and might have a variety of shapes. For example, a virtual play area might be three dimensional. As different examples, some virtual environments might be depicted as irregularly shaped (e.g., as a cavern on a moon or planet), need not have defined walls or floors (e.g., and might be depicted as having no gravity), might rotate about an axis, and/or might be non-Euclidian. If a play area is three dimensional, various dimensions (e.g., on an x, y, and z axis) may be taken into account. For example, if a play area is three dimensional, then users might be assigned all or portions of the combined virtual play area 405 based, in part, on the height of the room and/or the height of each user. As another example, if a play area is three dimensional, then the height of each user's play area (e.g., the height of their ceiling) might affect which portions of the combined virtual play area 405 they are assigned (e.g., so as to prevent encouraging a user to raise their arms and strike a low ceiling).

In the example portrayed in FIG. 4D that shows the virtual room 400*c*, virtual objects have been added to the virtual room 400*c*, including a virtual door 406*c* and a virtual lamp 406*d*. The virtual door 406*c* corresponds to a portion of the virtual room 400*c* where the first user might not travel, but (as described below with respect to FIG. 4E) an area where a second user might be able to travel. The virtual door 406*c* may provide a contextual reason why the second user may travel in that region but the first user cannot: for example, the second user might possess a key which allows them to unlock the virtual door 406*c*. The virtual lamp 406*d* corresponds to an area which the first user might not travel, and might provide a contextual reason why the first user cannot travel in that area. In this manner, the virtual room 400*c* has been configured for the first user in a manner which limits them to travel in the first user virtual play area 407*a*, but which does so in a potentially realistic manner.

Figure 4E:
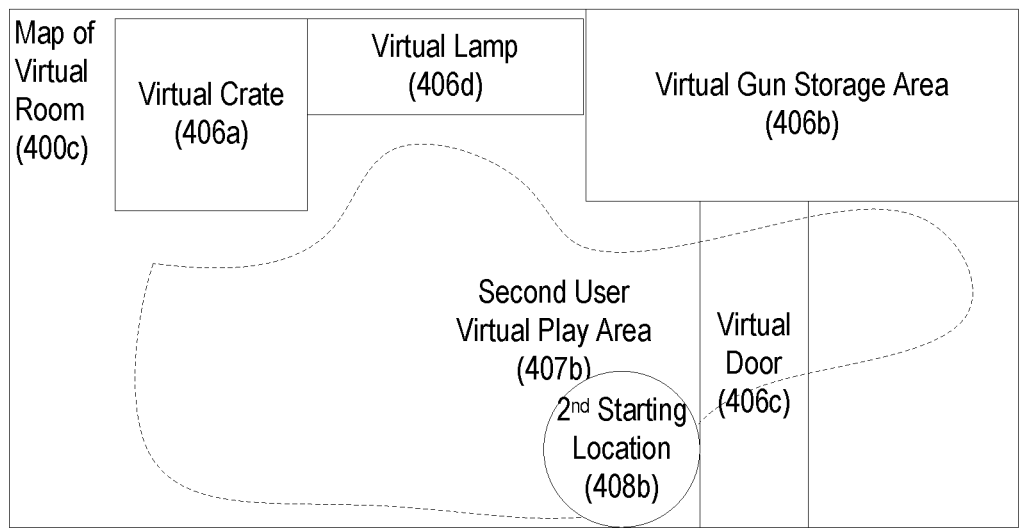
FIG. 4E shows an example second user virtual play area.

FIG. 4E shows an example of a second user virtual play area 407*b*, in the virtual room 400*c*, that includes a second starting location 408*b*. The same virtual objects (e.g., the virtual crate 406*a*, the virtual gun storage area 406*b*, the virtual door 406*c*, and the virtual lamp 406*d*) are present but, as indicated by the second user virtual play area 407*b*, the second user may be capable of traveling through (e.g., unlocking and opening) the virtual door 406*c*. The second starting location 408*b* is different from the first starting location 408*a*. In this manner, at the beginning of the XR experience, the first user and the second user might be portrayed to one another as standing in different portions of the virtual room 400*c*, and each user might be provided a different virtual play area.

Starting locations, such as the first starting location 408*a* shown in the example provided in FIG. 4D and the second starting location 408*b* shown in the example provided in FIG. 4E, might affect the manner in which an XR environment (e.g., the virtual room 400*c*) is portrayed. For example, the first starting location 408*a* may cause an XR device of a first user to render the virtual room 400*c* from a different perspective as compared to a perspective of a second XR device, used by a second user, that starts from the second starting location 408*b*. As will be detailed further below with respect to FIGS. 7A-7C, the starting locations may be based on a variety of considerations, including the current location of a user (e.g., in their physical environment), user preferences (e.g., where they usually like to stand in a virtual room), user role (e.g., positioning a user assigned a sniper role from the top of a tower, whereas a user assigned a soldier role is positioned at the bottom of a tower) or the like.

Figure 5A:
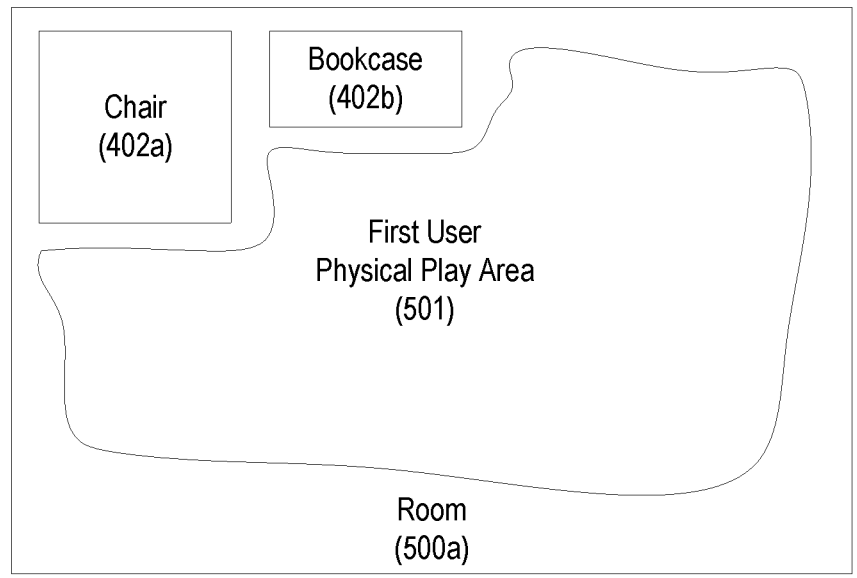
FIG. 5A shows an example first user play area.
Figure 5B:
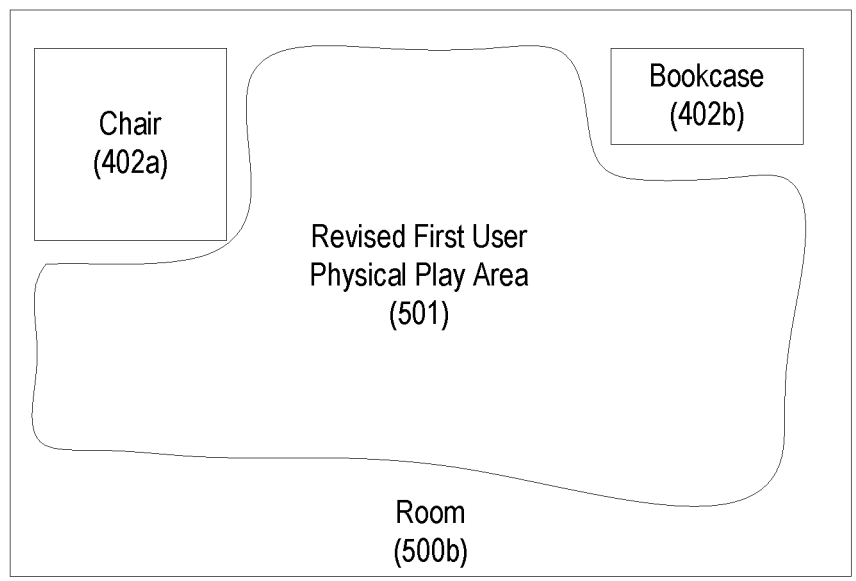
FIG. 5B shows an example revised first user play area.

As a preliminary discussion of FIGS. 5A-5B, objects in a room, such as the first physical environment 400*a* and/or the second physical environment 400*b*, need not be static. As will be detailed further herein, the play area of a user might change based on furniture in a room being moved (e.g., a chair being moved from one position to another), objects being activated (e.g., a fan being turned on), formerly benign objects becoming dangerous (e.g., a stove being turned on), or the like.

FIG. 5A shows a first user physical play area 501 in a room 500*a* that includes the chair 402*a* and the bookcase 402*b*. The first user physical play area 501 may be substantially the same as the first user physical play area 401. FIG. 5B depicts a room 500*b* that has been modified relative to the room 500*a* of FIG. 5A. In particular, the bookcase 402*b* has been moved to the upper-right corner of the room 500*b*. Such modifications may modify the available physical play area for a user. For example, the first user physical play area 501 has been modified in shape and is now displayed, in FIG. 5B, as a revised first user physical play area 501.

Many other changes to objects in the room 500*a* may occur. Some objects might be capable of being sat on or not being sat on at different times. For example, if a stack of books is placed on the chair 402*a*, it might no longer be capable of being safely sat on by a user during an XR experience. Some objects might become dangerous at different times. For example, if a stove is present in the room 500*a*, then if the stove is lit, the user should refrain from playing in an XR experience too close to the stove.

Changes to user physical play areas, such as shown in FIG. 5A and FIG. 5B, might require adjustment to allocations of a corresponding virtual play area. As will be described in greater detail below with reference to FIGS. 7A-7C, such changes might cause a user to be provided with a new virtual play area, and/or might cause modification of one or more virtual objects in a virtual play area. For example, as shown by the revised first user physical play area 501, the shape of a physical play area might change.

Figure 6A:
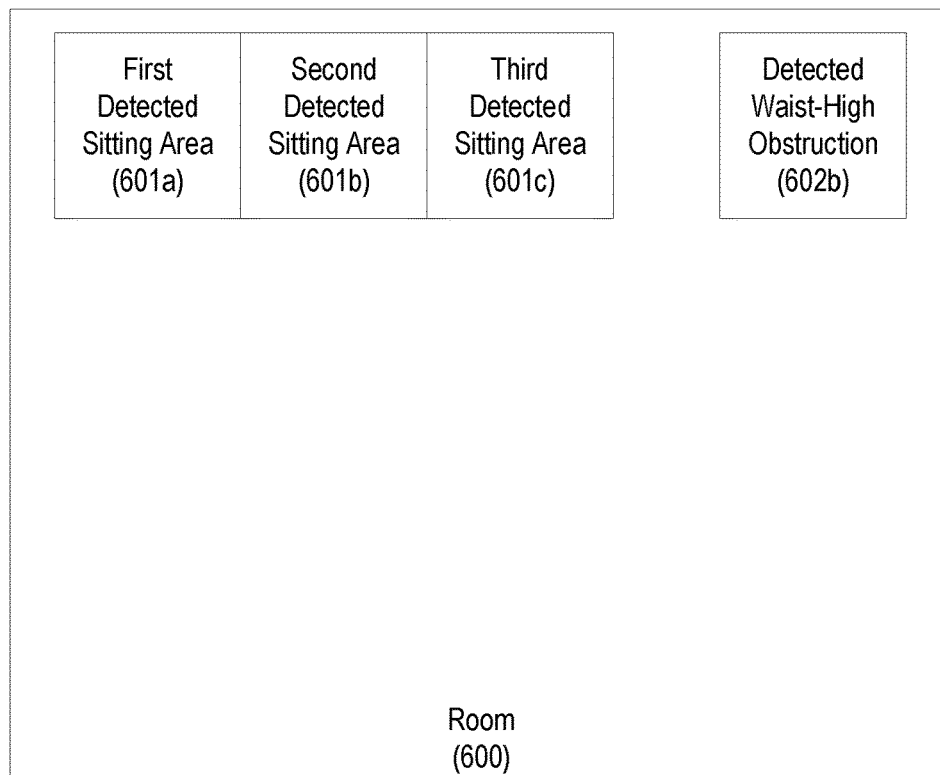
FIG. 6A shows an example room with detected objects.
Figure 6B:
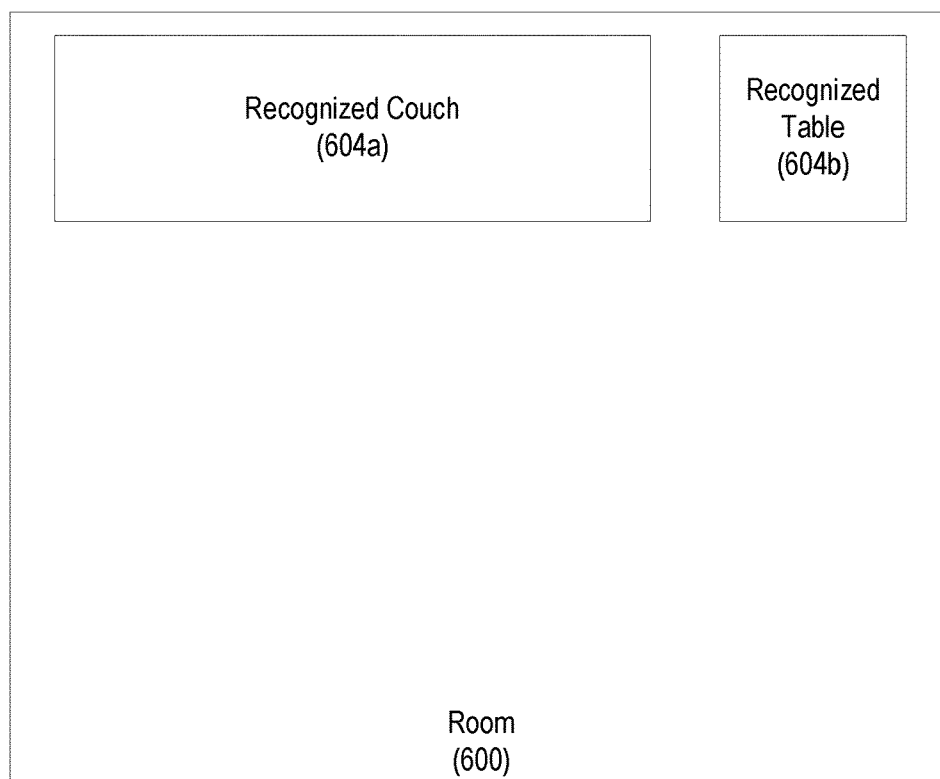
FIG. 6B shows an example room with predicted objects.

As a preliminary introduction to FIGS. 6A-6B, objects in a physical environment of a user might be identified by a system, such as the XR device, to better understand the physical environment of the user. Identifying (e.g., determining the identity of) of objects in a physical environment might be useful in that it might provide information about a physical play area of a user. For example, while a chair (e.g., the chair 402*a*) might provide an obstruction under certain circumstances, it might be desirable to use the chair to prompt the user to sit down in certain circumstances in an XR environment. As another example, a large bookcase (e.g., the bookcase 402b) might be immobile and quite large, such that space occupied by the bookcase cannot be used as part of a virtual play area.

FIG. 6A shows an example of a room 600 with a first detected sitting area 601a, a second detected sitting area 601b, a third detected sitting area 601c, and a detected waist-high obstruction 602b. FIG. 6A thereby represents portions of output from an XR device, such as the XR device 302. As will be described in more detail with respect to FIGS. 7A-7C, the XR device 302 might detect the presence of one or more objects. For example, the XR device 302 might capture images of one or more objects using the cameras 303d, and might use these images to query a database of known objects to identify such objects. The database may store information indicating images of the objects for pattern matching, and an object may be recognized or identified in a room if the image of the room includes a pattern matching a pattern in the database. The database may also comprise additional parameters for the object such as interactive surfaces (e.g., a seat of chair may be sat upon, while legs of the chair might be affixed and not amenable to interaction), types of interaction (button presses, moving parts, hinges, etc.), portability (e.g., whether the object can be moved, range of permitted motion, etc.), and any other desired characteristics. The XR device 302 might determine whether a user might be capable of interacting with the objects. For example, the XR device 302 might determine that one or more identified objects can be sat on by a user when the user is in an XR environment on by detecting, based on data from the motion sensitive devices 303c and/or data from the position tracking elements 303e, that a user has lowered near any one of the first detected sitting area 601a, the second detected sitting area 601b, and/or the third detected sitting area 601c for more than a predetermined period of time (e.g., longer than the user might comfortably squat or remain on their knees). As another example, the XR device 302 might detect, using the cameras 303d, the detected waist-high obstruction 602b, but not identify the waist-high object with any particularity.

FIG. 6B shows an example of the room 600 along with recognizing an identity of objects (specifically, a recognized couch 604a and a recognized table 604b) in the room 600. As shown in FIG. 6B, the arrangement of the first detected sitting area 601a, the second detected sitting area 601b, and the third detected sitting area 601c (and, e.g., the fact that the three seats are in a row) indicates that the three seating areas might in fact be a couch, as indicated by the recognized couch 604a. As also shown in FIG. 6B, the detected waist-high obstruction 602b has been predicted to be a table, as indicated by the recognized table 604b. Such a recognition process might entail use of the database described above, wherein one or more images of the room 600 are used by the XR device 302 to perform a pattern matching operating to identify corresponding objects in a database.

The identification of objects in a room (e.g., by matching images of the room to images in a database using a pattern matching algorithm), such as the room 600, might allow a XR environment to learn about the physical environment of a user. The XR device 302 might use the cameras 303d to collect images of a room and, based on those images, query a database to identify one or more objects in a physical environment surrounding the XR device 302. Based on the identification of those one or more objects, corresponding virtual objects might be output in an XR environment. For example, the presence of the recognized couch 604a might enable an XR environment to include a couch as well, thereby allowing a user to sit in their real couch to sit in a virtual couch. That said, in multiplayer environments, not all users might have such a couch, and adjustments to the XR environment might be made. For example, one XR device might use its cameras to detect a first couch, whereas a second XR device might not detect a couch in its physical environment. As such, a virtual object corresponding to an object only in one user's environment might be rendered in a manner to limit interaction by other users. For example, if one user of a multiplayer XR environment has a couch (e.g., corresponding to the recognized couch 604a) but a second user does not have a couch, a virtual couch might be displayed in an XR environment, but the couch might be displayed, to the second user, as partially transparent or otherwise inaccessible. The manner in which an object might indicate it cannot be interacted with might differ based on the object. For example, some objects might be displayed as partially transparent, whereas others might be portrayed as broken, distant, or otherwise inaccessible to some users. A database might store information indicating how objects are to be displayed to different users based on their physical environment. For example, a database might indicate that a virtual couch is to be displayed as opaque to a user that can sit in the virtual couch, whereas the same virtual couch is to be displayed as partially translucent to users that cannot sit in the virtual couch.

One advantage of providing objects in a room might be to allow users to combine different objects in their environments into a virtual play area. For example, an XR environment might comprise a virtual movie theater with hundreds of seats. Multiple users might desire to, in the XR environment, watch a movie together. A chair or other object which might be sat on might be detected in each XR device user's room, and that chair might be mapped to a different virtual seat in the virtual movie theater. In this way, each user might be able to use their own chair at home, but might be portrayed as sitting in a different chair in the XR environment. Where different objects are combined into a virtual play area, it may affect the way in which different users experience the same virtual play area. For example, in a virtual movie theater XR environment, one user might see a virtual screen from a different perspective as compared to another player, as each user might sit in their own chairs to emulate being seated in different portions of the movie theater.

The identification (e.g., the predicted identification) of objects in a room, such as the room 600, might allow a XR environment to protect users from danger. For example, if a dangerous object is identified in the room 600, then the XR environment may be configured to discourage a user from approaching or otherwise interacting with the dangerous object.

Figure 7A:
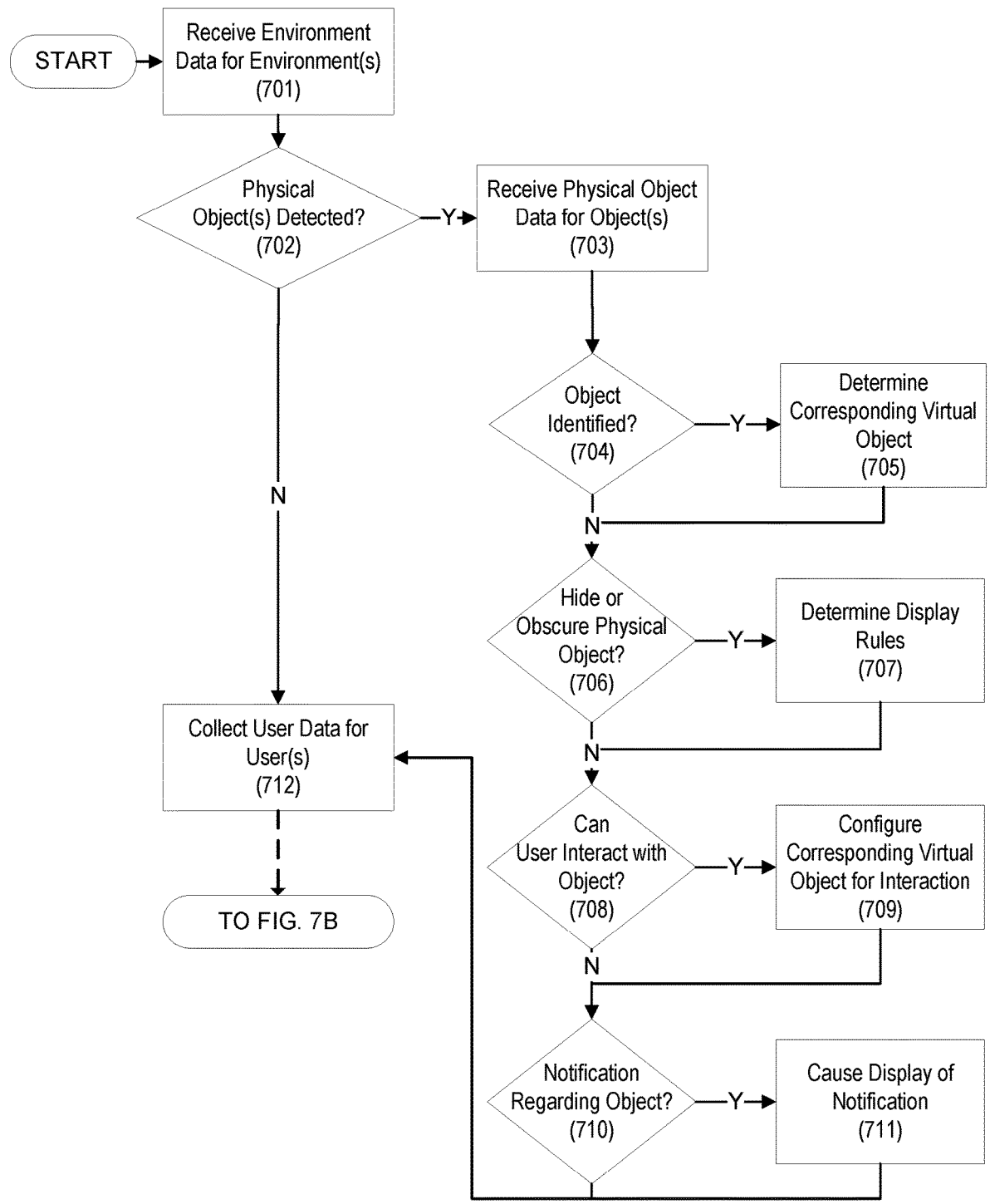
FIG. 7A shows a first portion of a flowchart for providing a multiplayer XR experience.
Figure 7B:
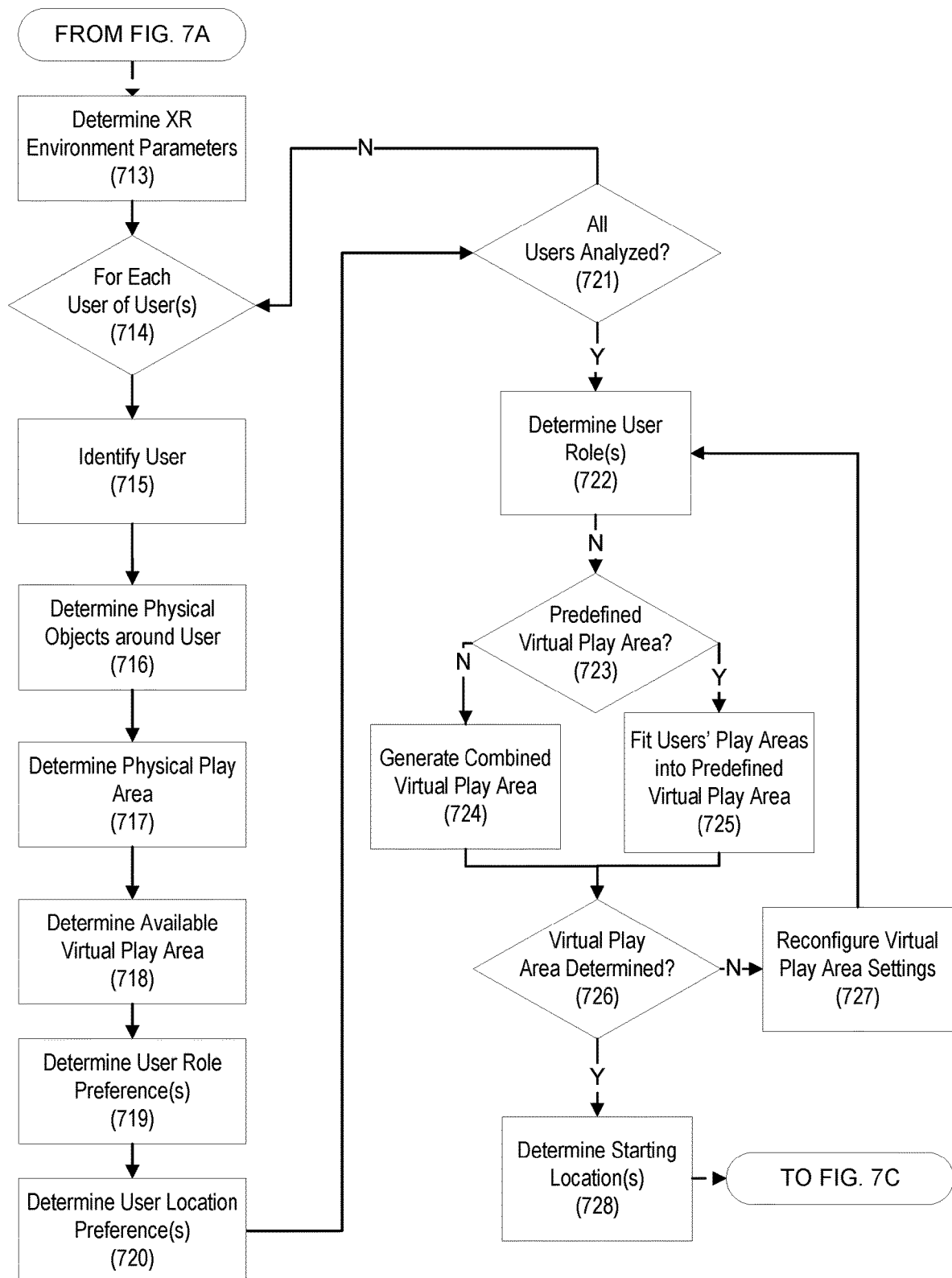
FIG. 7B shows a second portion of a flowchart for providing a multiplayer XR experience.
Figure 7C:
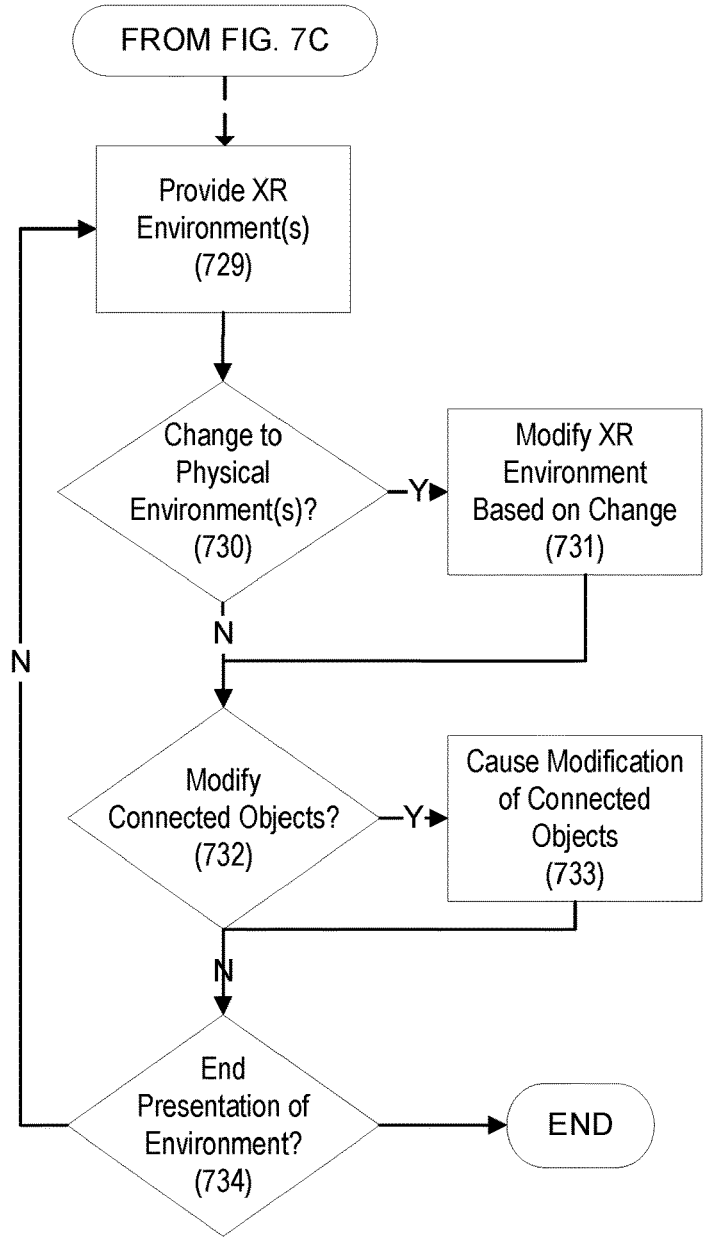
FIG. 7C shows a third portion of a flowchart for providing a multiplayer XR experience.

Discussion will now turn to steps which may be performed, by a computing device, for providing an XR environment. The steps shown in FIGS. 7A-7C might, for example, be performed by a computing device such as the on-board computing device 304, the support computing devices 301, or any combination thereof, and may involve one or more of the sensors of the XR device 302. A computing device may comprise one or more processors and memory storing instructions that, when executed, cause performance of all or some of the steps of FIGS. 7A-7C. The steps and the ordering of steps shown in FIGS. 7A-7C are illustrative, and might be re-arranged, omitted, and/or duplicated as desired. For example, the steps depicted in FIG. 7A relating to detecting physical objects might be omitted in circumstances where XR devices used are relatively underpowered. As another example, additional checks and/or steps may be performed after step 710 of FIG. 7A.

In step 701, environment data for one or more environments may be received. Environment data may comprise any information about a physical environment, such as one located around an XR device such as the XR device 302. For example, environment data might indicate a shape of a physical environment, might include one or more images of the physical environment, might indicate a temperature of the physical environment, might comprise information about sounds in the physical environment, or the like. The XR device 302 might use sensors, such as the cameras 303d and/or the position tracking elements 303e, to collect environment data. For example, the cameras 303d may be configured to collect images of the physical environment.

The environment data may indicate the presence of one or more objects in a physical environment. For example, the cameras 303d may capture images of the chair 402a and/or the bookcase 402b. The environmental data may be processed using object recognition algorithms to isolate and identify such objects. For example, an object recognition algorithm may be executed with respect to images captured by the cameras 303d to identify the chair 402a amongst other objects in the first physical environment 400a, such as a wall and/or the floor.

The environment data may additionally and/or alternatively comprise information about the physical environment that has been provided by a user. For example, the environment data may comprise an indication of a size of the room, a shape of the room, a ceiling height, or other parameters. Such parameters might be determined via a training process (e.g., prompting a user to walk the perimeter of their room), via manual input (e.g., a user providing a manual measurement of the walls of their room), or the like.

In step 702, it may be determined whether one or more physical objects are detected. Detecting the physical objects might be based on the environmental data. For example, an object recognition algorithm may be executed with respect to images of a room, and the algorithm may be configured to output whether one or more objects have been identified in the physical environment. If one or more objects are identified, the flow chart proceeds to step 703. Otherwise, the flow chart proceeds to step 712.

In step 703, physical object data for the one or more detected objects may be received. The physical object data may comprise data from, and/or in addition to, the environmental data. Receiving the physical object data may comprise causing one or more sensors of the XR device 302 to collect additional information about one or more detected objects, which may be in addition to information already collected as part of the environment data. For example, the cameras 303d may be configured to collect additional images of an object detected in step 702. As another example, the position tracking elements 303e may be configured to determine a distance between a user and the object.

The physical object data collected in step 703 may be used to recognize an object in an environment. An XR device, such as the XR device 302, might use cameras to collect images of a physical environment. Based on those images, a database might be queried to identify one or more objects in a physical environment of the XR device 302. For example, the images might be transmitted to the support computing devices 301, which might use one or more object recognition algorithms to isolate one or more objects in an environment of the user. Such object recognition algorithms might use, for instance, the shape, size, and/or color of the images to help identify objects in the room.

In step 704, it is determined whether an object has been identified from the environment data and/or the physical object data. Identifying the object may comprise executing one or more object recognition algorithms on the environment data and/or the physical object data. For example, an object recognition algorithm may be executed with respect to images captured by the cameras 303d to identify one or more objects in a physical environment. Identifying the object may comprise determining that the object belongs to one or more of a plurality of different object categories (e.g., objects which might be sat on, objects which cannot be moved, objects which may be moved, objects that are dangerous, or the like). Such object categories might be defined in an objects database, such as a table which indicates the shape of certain objects and corresponding characteristics of those objects. For example, such a database might indicate that objects that are flat with four legs are a chair, and generally such chairs may be sat on by a user. As another example, such a database might indicate that objects which are square and the same height or higher than a user are likely a bookcase or chest of drawers, and that such objects cannot be sat on or interacted with safely while the user is in an XR environment. Using such a database, a users' ability to interact with an object may be determined. For example, based on the environment data and the physical object data, the chair 402a may be identified to be an object that may be sat on. As another example, using such a database and based on the environment data and the physical object data, a stove in a kitchen might be identified as potentially dangerous and not interactive (at least while the user is in an XR environment). If the object is identified, the flow chart proceeds to step 705. Otherwise, the flow chart proceeds to step 706.

The objects database referenced above need not be universal, and might depend on how the XR environment is intended to be interacted with by users. For example, one XR environment (e.g., for a virtual chatroom) might indicate that chairs can be sat on, whereas another (e.g., an exercise game) might indicate that chairs should not be interacted with. As another example, an XR environment involving lots of motion might determine that any object in a physical environment is a possible hazard, whether or not the object is on the ground, on a wall, or the like.

The objects database referenced above might additionally and/or alternatively comprise one or more rules for objects. Such rules might indicate that an object is dangerous. For example, the objects database might specify that objects which appear to be stoves should be avoided. Such rules might indicate whether an object should be wholly or partially obscured. For example, the objects database might specify that objects which appear to be posters should be obscured so as to preserve immersion in the XR environment.

In step 705, a corresponding virtual object may be determined. Determining a corresponding virtual object may comprise determining a virtual object that corresponds to a physical object, such that properties of the physical object might be replicated in an XR environment. For example, if a chair is detected, then the virtual object may be a chair of a different style. More broadly, the corresponding virtual object need not be identical to a physical object. Indeed, broad categories of physical objects might correspond to the same virtual object. For example, all large and substantially wide physical objects (e.g., beds, desks, tables) might correspond to a virtual crate in an XR environment. As another example, all long and tall objects (e.g., a lamp, a bookshelf) might correspond to a virtual pillar. Which virtual objects correspond to which physical objects may be defined for a particular XR environment. For example, the virtual objects for a war game might be different than those for a virtual chatroom, such that the same physical object might correspond to different virtual objects depending on which XR environment is presented.

Determining a corresponding virtual object may comprise determining one or more properties of a physical object. As part of recognition of a physical object (e.g., using the cameras 303d), the XR device 302 might be configured to determine one or more properties of a physical object, including whether or not the physical object might be capable of interaction. For example, a chair with arms might present different interactivity options than a chair without arms (e.g., a user generally cannot sit in a chair with arms backwards), such that determining a corresponding virtual object for a chair might comprise determining whether the chair has arms. The properties may additionally and/or alternatively comprise, for example, a height of the object, a width of the object, a depth of the object, a rotation of the object, a color of the object, or the like. All such properties may be used to determine a corresponding virtual object. In some instances, the properties determined by the XR device 302 might correspond to whether an object might be interactable. For example, the XR device 302 might use the cameras 303d to not only identify a chair in an environment, but to also (e.g., based on comparing the chair to an expected shape) determine whether the chair is potentially broken. Properties of the physical object might indicate that an entirely dissimilar virtual object should be selected. For example following the previous example, if a real-life chair is broken, then a corresponding virtual object might be a hunk of debris (and, e.g., not a chair, such that the user is discouraged from trying to sit on the real-life broken chair). A user might be capable of indicating whether an object should be used. For example, if a chair is detected in a physical environment, the user might be prompted to select whether the chair should be used in an XR environment. Such an interface is illustrated in FIG. 9B, discussed below.

In step 706, it may be determine whether to hide or obscure one or more portions of one or more physical objects. Such a circumstance might arise in the context of an augmented or mixed reality environment, where all or portions of a physical environment might be displayed to a user in an XR environment. It may be desirable to obscure all or portions of a physical object in an augmented or mixed reality environment to, for example, improve the immersion a user experiences in an XR environment. Additionally and/or alternatively, it might be desirable to obscure all or portions of a physical object to improve the privacy of one or more users. If the answer to step 706 is yes, the flow chart proceeds to step 707. Otherwise, the flow chart proceeds to step 708.

In step 707, one or more display rules for one or more physical objects may be determined. A display rule may comprise a rule to obscure all or portions of a physical object (e.g., by hiding it behind a virtual object), to blur all or portions of a physical object, to replace all or portions of a physical object with a corresponding virtual object, or the like. Such rules might be specified in the objects database discussed above with respect to step 704. For example, if a paper is to be obscured using display rules, then the paper might be displayed, but the text on the paper might be replaced with different text.

In step 708, it may be determined whether a user may interact with a physical object. A user might be able to interact with a physical object by, for example, moving it, sitting on it, leaning against it, hiding behind it, or the like. Such interactions might be used with a corresponding virtual object to aid in the immersion of an XR environment. Determining whether a user may interact with a physical object may be based on the physical object data and/or the environment data. For example, if an object is categorized as a chair, it might be determined to be capable of interaction in that a user might be able to sit on the chair. Such information may also be inferred based on activity of a user of an XR device. For example, if a user moves to an object and sits on it when using the XR environment, it may be inferred that the object may be sat on. Additionally and/or alternatively, as illustrated and discussed below with respect to FIG. 9B, a user might be presented a user interface which permits the user to indicate whether an object may be sat on. If the user may interact with an object, the flow chart may proceed to step 709. Otherwise, the flow chart may proceed to step 710.

In step 709, a virtual object may be configured in a manner corresponding to interactions capable with a physical object. Configuring a virtual object might comprise modifying the virtual object to operate in a manner based on a corresponding physical object. For example, a virtual couch might be resized (e.g., size properties of the virtual couch might be modified) to the same size as a physical couch, such that a user might touch the physical couch and believe they are touching the virtual couch. As another example, a height of a virtual chair might be modified to be the same height as a physical chair, such that the user is able to sit down comfortably without the jarring effect of sitting sooner than (or later than) expected. For example, if the physical object may be sat on, then a corresponding virtual object may be configured to be sat on. As another example, if a physical object may be moved, then a corresponding virtual object may be configured to be moved.

In step 710, it may be determined whether to output a notification corresponding to the object. In some circumstances, such as where a physical object has been identified, it might be useful to provide a user warnings or other similar notifications about the physical object. A notification may be any form of message about a physical object, such as a safety warning, a request to move and/or reconfigure the physical object, and/or an advertisement to buy a new model of the physical object. For example, if the physical object is a tripping hazard (e.g., is low to the ground relative to the XR device), a notification warning a user about the tripping hazard may be determined. As another example, if a physical object has been identified and a user has indicated that the physical object is to be used during gameplay (e.g., using the user interface illustrated in FIG. 9B), then the notification might indicate that the physical object has been successfully identified and will be used during gameplay until the user indicates otherwise. If a notification has been determined, then the flow chart may proceed to step 711. Otherwise, the flow chart may proceed to step 712.

In step 711, the notification may be displayed. Display of the notification may comprise displaying the notification as part of an XR environment. For example, the XR environment may comprise a user interface, and the notification may be displayed by causing the user interface to display the notification. As another example, the notification may be displayed by sending an e-mail to an e-mail address associated with a user and/or a text message to a phone number associated with the user, thereby causing another computing device to display the notification.

Notifications need not particularly relate to the XR environment itself. For example, a notification might be generated based on determining, using the environment data, that a particular object in a room is unsafe, out of warranty, subject to recall, or the like. In this manner, a user of an XR device might be provided safety warnings about their surroundings, even if those warnings do not necessarily relate to the XR environment. Determining that a particular object in a room is unsafe, out of warranty, subject to recall, or the like may comprise using the environment data (e.g., images of an object) to query one or more databases storing information about warranties, recalls, safety, or the like. For example, an image of a stove might be captured by the cameras 303d, and the image might be used to query a recall database to determine that the stove is subject to a safety recall. In such a circumstance, the notification might alert a user that the stove should not be used and should be repaired or returned to the manufacturer.

To determine whether an object is unsafe, out of warranty, subject to recall, reference images of objects known to be unsafe, out of warranty, and/or subject to recall may be stored in a database and queried. For example, a database might be configured with reference images and/or 3D models corresponding to unsafe objects (e.g., knives), objects subject to recall (e.g., a particular toy subject to a safety recall, a hairdryer known to catch fire), and/or objects that are out of warranty (e.g., old television models). As another example, a database might be configured with reference images of logos, and those reference images might be compared to captured images of an environment to determine the manufacturer of a device. In such a circumstance, the database might store contact information for a manufacturer (e.g., for a warranty and/or recall database for the manufacturer), and that contact information may be used to determine whether a notification exists. As another example, a user might be prompted to register various objects in their environment (e.g., by capturing images of the object, entering in a serial number of the object, capturing a tag or sticker on the object, or the like), and such registrations may be used to identify the object(s). One or more images captured by the cameras 303d might be used to query the database to determine if one or more objects in the one or more images correspond to a reference image and/or 3D model in the database. As part of this process, various computer vision techniques may be used to determine a sufficiently high match probability of objects in a room (e.g., as captured by the cameras 303d) as compared to the reference images and/or 3D models.

The notifications might relate to safety. Environment data might indicate unsafe conditions in a variety of ways: for example, an Internet-connected steam oven might be set at a high temperature with the door not closed, infrared sensors of the XR device 302 might detect an unusually high quantity of heat somewhere in a room, objects in a room might, in images captured by the cameras 303d, appear to be dangerous (e.g., sharp), or the like. For instance, the cameras 303d might detect motion in the room (e.g., from a robot vacuum, pet, or the like) by capturing a series of images of the room over time and detect that a tripping hazard might exist. A user may provide parameters for which unsafe conditions should trigger notifications. For example, a user might provide input in a settings menu that specifies that tripping hazards should trigger warnings, but other safety issues (e.g., potentially sharp objects) should not trigger warnings (e.g., because the user is already aware of them).

Determining that a particular object in a room is unsafe, out of warranty, subject to recall, or the like may comprise determining that an object is in proximity to a user of an XR device (e.g., the XR device 302). In this manner, the cameras 303d and/or other sensors of the XR device 302 might not detect an object in a room (e.g., because it is out of the field of view of the cameras 303d), but the object might nonetheless be determined to be unsafe, out of warranty, subject to recall, or the like and the user of the XR device 302 might be notified. Determining the proximity of an object might be based on wireless connectivity of the object. For example, if the object is connected to a wireless network, information about beamforming and/or steering of a wireless signal might be used to determine an approximate location of an object. As another example, if the object is connected to one wireless network (e.g., for one side of a house) instead of another (e.g., for another side of the house), this information may be used to infer a location of the object. The location of an object might be triangulated based on its connectivity to various wireless networks and/or hotspots. For example, an object might be configured to periodically report network strength information, and that network strength information might be used to predict a location of the object.

One circumstance where a notification might be output is where a physical object might be out of warranty or otherwise old and requiring replacement. An objects database might be configured to identify appliances in a physical environment of the user, such as identifying a refrigerator, a stove, a washing machine, or the like. The objects database might be configured to identify (e.g., based on images captured by the cameras 303d, such as by identifying a bar code, a serial number, a quick response (QR) code, or other indicia) a particular brand, model, or operating status of the appliances. Based on such an identification, the XR device 302 might query a database to see if a new model of the appliance exists, if the appliance is on a recall list, and/or whether the user should be prompted to purchase a different (e.g., superior) appliance. For example, it may be determined that the physical environment of a user includes a particularly unsafe stove, and the notification might warn the user of the lack of safety and recommend one or more alternative stoves for purchase.

In step 712, user data for one or more users may be collected. User data may be any information about users, such as their height and/or weight, their preferences, or the like. The user data may indicate physical properties of the user (e.g., their height, weight, any mobility limitations). The user data may additionally and/or alternatively indicate user preferences, such as a desired level of motion, whether the user prefers to sit and/or stand, preferred gameplay roles of a user (e.g., sniper, hand-to-hand combat), or the like. The user data may be collected via one or more menus or prompts to the user. For example, as illustrated in the menus depicted in FIGS. 9A-9B (discussed below), a user might be prompted to select a role they like to be assigned in an XR environment, and/or might be prompted to provide an indication of how much exercise they would like to perform in the XR environment.

FIG. 7B shows a second portion of a flowchart for providing a multiplayer XR experience. In particular, FIG. 7B continues after step 712 of FIG. 7A, and begins with step 713.

In step 713, XR environment parameters may be determined. The XR environment parameters may comprise, for example, a map of an XR environment, roles which may be assigned to users in the XR environment, or the like. For example, the XR environment parameters may comprise the map of the virtual room 400c, including indications of virtual objects such as the virtual crate 406a and the virtual gun storage area 406b. As another example, the XR environment parameters might comprise a list of roles which might be assigned to one or more participants of the XR environment. The XR environment parameters may additionally and/or alternatively comprise an available play area, such as the combined virtual play area 405.

In step 714, the flowchart begins a loop for each of the one or more users. Any number of users may be analyzed using the process detailed in the flowchart. As will also be described later with respect to step 721, steps 715-720 are configured to repeat for each user of one or more users, and until all users are analyzed.

In step 715, a user may be identified. The user may be identified from the one or more users of the user data determined in step 712. The user may correspond to a portion of the environment data in step 701, one or more of the physical objects detected in step 702, and/or a portion of the user data collected in step 713. Identifying the user may comprise determining a method of identifying, from the environment data, the one or more physical objects, and/or the user data, a portion corresponding to a particular user.

In step 716, physical objects around the user may be determined. The physical objects detected in step 702 may be for a plurality of users and/or only a single user. In step 716, physical objects that are around the user identified in step 715 may be determined. Such a step may comprise filtering the objects detected in step 702 based on an indication of a user to determine which of a plurality of objects correspond to the user identified in step 715.

In step 717, a physical play area for the user may be determined. A physical play area might correspond to an area which might be physically traversable by a user, including areas where the user might walk, sit, crawl, or the like. Such a play area might be determined (e.g., by the XR device 302, such as via the on-board computing device 304 and/or the support computing devices 301) using one or more methods which determine boundaries of the area which is physically traversable by a user. For example, determining the physical play area may comprise determining, based on the physical objects determined in step 716, an area where the user may move (e.g., walk, sit, crawl, run, or the like), even if such movement might be difficult and/or impractical. For example, the physical play area determined might include tight corners or areas of a room that might be uncomfortable for a user to be located in, but nonetheless might conceivably be moved in by a user. Additionally and/or alternatively, determining the physical play area may comprise using the cameras 303d to retrieve images of a physical environment and, based on those images, determine walls and/or perimeters of a physical play area. Additionally and/or alternatively, determining the physical play area may comprise using the position tracking elements 303e to determine where a user is located and/or where a user has traveled, which may indicate one or more areas where the user may travel (e.g., all or portions of the physical play area). A combination of these approaches might be used: for example, a combination of data from the cameras 303d and the position tracking elements 303e might be used to determine the physical play area. Determining the physical play area may additionally and/or alternatively comprise determining the physical play area based on the user data and/or the environment data. For example, the physical play area may be based on a size of a room and a height of the room (indicated by the environment data) as well as a height and weight of the user (indicated by the user data).

In step 718, an available virtual play area may be determined. The available virtual play area may correspond to an area that a particular user may travel while in an XR environment, and may be the same or different as compared to the physical play area determined in step 717. For example, the available virtual play area might be a subset of the physical play area, keeping in mind that the user should be kept a sufficient distance away from walls and objects so as to keep the user from inadvertently striking walls/objects. The available virtual play area might be determined based on the available areas of all users. For example, multiple users might be located in the same physical room, such that each user might be assigned a different portion of that physical room (so as to, e.g., avoid colliding with one another during gameplay). As another example, the available virtual play area might be based on the available areas of all users in an XR environment. For example, if all users are to be seated in the XR environment, then the available virtual play area need not occupy the entirety of the physical space available to a user (e.g., because the user might not move much while in the XR environment). Determining the available virtual play area may comprise determining a shape (whether two- or three-dimensional) of the available virtual play area. Such a shape might define the outer contours of all or portions of the physical play area. The available virtual play area need not be the same size or shape as the physical play area determined, and in many cases might be different in size, scope, and design. For example, based on determining one object in a physical play area is dangerous, the available virtual play area may be shaped in a manner that discourages a user from getting near the dangerous object. As another example, the available virtual play area might be a shape (e.g., a rectangle) that is a subset of the physical play area. Setting the available virtual play area to a discrete shape (e.g., a rectangle) may make fitting the available virtual play area into a predefined virtual play area, as will be described below with respect to step 725.

The physical play area determined in step 717 might be simplified and/or otherwise reshaped to form the available virtual play area. The physical play area determined in step 717 might reflect a number of areas where a user might travel which, practically speaking, might be impracticable for the purposes of enjoyment of an XR experience. For example, a user might be capable of ascending a staircase in a room, but doing so while wearing an XR device might be unsafe and difficult for the user. The available virtual play area might be a simplified version of the physical play area in that it lacks many areas associated with danger, complex movement, or the like.

An example of a difference between the physical play area of step 717 and the available virtual play area of step 718 shows the difference between the two areas. A user in a bedroom might have a physical play area that includes a variety of areas which a user might feasibly travel, such as walking on their bed, crawling underneath a bedside table, or the like. Such movement opportunities might be useful in some circumstances, but in others might be implacable or difficult. Given all of these different movement opportunities and locations, the physical play area might have a border that is a complex polygon. In contrast, the available virtual play area might represent a subset of the physical play area, such as a discrete rectangular shape that is a subset of the physical play area and which does not include objects which require certain types of movement. As an example of the latter, a user might be physically able to climb on top of a table as part of an XR experience, but doing so might be impractical if the XR device is tethered to a computer using a short and potentially fragile cord.

In step 719, user role preferences may be determined. User role preferences may comprise any indication of XR experience preferences of a user, such as a preferred character or gameplay role (e.g., sniper, soldier, hand-to-hand combat), a preferred form of gameplay (e.g., seated, standing), a preferred activity level (e.g., frequent motion, infrequent motion), a preferred communication level (e.g., silent, frequently talking to other users), or the like. A role need not suggest a formal role (e.g., soldier, sniper), but might instead broadly refer to interactions in the XR environment (e.g., teacher or student, active participant or spectator). Such user role preferences may thereby provide an indication of which role the user might like to take in an XR environment. The user role preferences may be specified by the user data determined in step 712.

The user role preferences might comprise movement preference information. Movement preference information might indicate a desired amount or nature of movement for a particular user. For example, a seated user might indicate that they do not wish to stand up. As another example, a physically impaired user might indicate that they wish to not move too quickly or too frequently. The movement preference information might additionally and/or alternatively relate to exercise. For example, the movement preference information might indicate that a user wants to walk a particular number of steps as part of an XR experience. As another example, the movement preference information might indicate one or more areas of the body that a user would like to train.

As part of determining user role preferences, users might be prompted to provide their preferences. For example, before an XR environment begins, a user might be prompted to select (e.g., via a menu) a particular role that they would like to play. Selecting a particular role might be contingent on the user changing their physical environment. For example, to select a role involving a lot of action, a user might be required to move a chair away from a play area. As another example, to select a role that involves sitting down, a user might be prompted to sit down in advance.

In step 720, user location preferences may be determined. User location preferences might correspond to any preferences a user has with respect to their location in a physical or virtual environment. For example, a user might prefer to be located in a particular portion of a room because it is away from a window or door. As another example, a user might prefer to start in a calm part of a virtual environment. User location preferences might be relative to an object and/or other users (e.g., starting away from in-game monsters, starting close to other users, starting close to a virtual bar). User location preferences might be specified in terms of strength (e.g., a strong preference to start close to other users, a weak preference to start sitting down).

In step 721, it is determined whether all users have been analyzed. If not, the flow chart returns to step 714, and loops for each remaining user. Otherwise, the flow chart proceeds to step 722.

In step 722, user roles may be determined for each user. A user role may correspond to one or more tasks that the user must perform, virtual items that a user might be provided, a starting location of the user, or the like. For example, a sniper role might correspond to a user starting at the top of a building with a sniper rifle, whereas a hand-to-hand role might correspond to a user starting on the ground without any items. The user roles may be based on the user role preferences. For example, if a user prefers to play a distant and relaxed role over an up-close and energetic role, the user might be assigned a sniper role instead of a hand-to-hand role. The user roles may be based on the user location preferences. For example, if a user prefers to exercise when in an XR experience, the user might be assigned a hand-to-hand role.

The determination of user roles need not perfectly satisfy the user role preferences and/or the user location preferences. Some roles might be undesirable or otherwise not preferred by users, and yet assignment of those roles might be required as part of an XR environment. The determination of user roles might take user role preferences and/or user location preferences into consideration, but need not satisfy all preferences. For example, if all users desire to be a soldier, one user might nonetheless be assigned the role of a sniper to ensure that the XR experience is sufficiently diverse.

In step 723, it is determined whether the XR experience has a predefined virtual play area. A predefined virtual play area might be an area that has been configured for an XR experience, and might not be readily resized or otherwise configured based on the physical environments of one or more users. For example, if the XR experience is a football game, then the predefined virtual play area might be a predefined football field with specific size parameters that do not change regardless of the environment of a user. As another example, if the XR experience is a spaceship battle game, then the predefined virtual play area might be a predefined map of the inside of a spaceship, but the outside of the spaceship (e.g., space) might not have a predefined virtual play area. Such predefined virtual play areas might exist for certain XR games, as the environments in those games might be particularly laid out and styled by game designers to aid in immersion. Determining whether the XR experience has a predefined virtual play area may be based on the XR environment parameters. For example, determining whether the XR experience has a predefined virtual play area may be based on determining whether the XR environment parameters comprise a map of an area within which users may interact in the XR experience. If the XR experience does not have a predefined virtual play area, the flow chart proceeds to step 724. If the XR experience has a predefined virtual play area, then the flowchart proceeds to step 725.

A predefined virtual play area may be predefined in a wide variety of ways. A predefined virtual play area may comprise a custom-made three-dimensional map which may be traversed by one or more users. That said, the predefined virtual play area need not be so specific or fixed. For example, a predefined virtual play area might merely comprise an indication of one or more objects which must be present in a virtual play area, whether or not the particular locations of those objects is specified. For example, a predefined virtual play area for a virtual classroom might specify that a virtual presentation board must be present in front of a plurality of virtual chairs, but need not specify the exact number of chairs, the particular design of the classroom, and/or the size of the classroom.

The same XR experience might have predefined virtual play areas or some circumstances and no predefined virtual play areas for others. For example, for a spaceship game, a game might have game modes using predefined virtual play areas (e.g., the inside of a space ship, where users can walk from room to room and explore various aspects of the spaceship) and game modes without predefined virtual play areas (e.g., out in space, where players might be able to travel without obstruction). As such, for the same XR experience, the decision in step 723 might be different at different times. Indeed, the same XR experience might be different for different players at different times: as two players might be in a virtual spaceship and two other players might be in space, some players might be in a portion of an XR environment having a predefined virtual play area, whereas others might not.

In step 724, based on determining that the XR experience does not have a predefined virtual play area, a combined virtual play area may be generated. For example, in the spaceship game example provided above, a predefined virtual play area might not exist for space, such that a combined virtual play area might be generated for players who want to play outside of a spaceship. A combined virtual play area may be a combination of one or more virtual play areas determined for one or more users, such as the virtual play areas determined in step 718. An example of a combined virtual play area is provided as the combined virtual play area 405 of FIG. 4C. In other words, based on the shapes and parameters of individual available virtual play areas, a combination of these play areas may be generated. Such a combination may comprise substantially overlapping at least a portion of the play areas, such that the users share a common area within which they all may move. The combined virtual play area might be based on overlap between the different available virtual play areas. For example, a degree of overlap of the available virtual play areas might be maximized to ensure that users are able to enjoy as much of the same area as possible. Additionally and/or alternatively, the combined virtual play area may be generated such that the play areas do not overlap. In such a circumstance, each user might have their own separate area to move in the XR experience.

Generating the combined virtual play area may comprise resizing and/or otherwise scaling all or portions of users' available virtual play area. Because the size and scale of different users' environments may vary, each environment might be standardized or otherwise resized. For example, if a first user is playing in a large room and a second user is playing in a small room, then the combined virtual play area may be configured such that the second user is larger than the first user, such that the differences in room size is accounted for by making the second user appear to be larger. For example, the virtual environment might have Alice in Wonderland-type gameplay elements, where certain players appear to grow larger in comparison to other users. Such resizing and/or scaling may additionally and/or alternatively be performed with respect to the combined virtual play area as well. For example, the combined virtual play area might be resized based on the users' available virtual play area such that all users have a consistent experience.

A player's role might be modified based on the size and scale of an environment. For example, if one user has a comparatively smaller room than another, the user might be provided a role that involves playing a physically larger character (e.g., a large robot) as compared to another user. In this manner, the users might all be capable of traversing the same virtual play area, but the size of their movements in that virtual play area might be adjusted to reflect the comparative sizes of their rooms.

Generating the combined virtual play area may comprise determining one or more regions where certain users are prevented from traveling. Because the size and shape of available virtual play areas may be different, certain users might be permitted to move in certain areas that other users are not. An example of such a circumstance is provided above regarding FIG. 4D and FIG. 4E, where the first user is prevented by the virtual door 406c, but the second user is not.

The combined virtual play area need not comprise all portions of the users' available virtual play areas. Some portions of a user's available virtual play area might go unused. For example, if a user's available virtual play area is unusually shaped (e.g., an oval), then portions of it might go unused so as to reshape the available virtual play area into a more usable shape (e.g., rectangular) for a particular XR experience.

The combined virtual play area need not be available to all users at all times. As indicated by FIGS. 4C-4E, users might be allocated portions of a combined virtual play area based on the shapes of their play areas. In turn, while a first user's virtual play area and a second user's virtual play area might partially overlap, the two users might also be capable of movement in regions where the other user cannot move.

In step 725, based on determining that the XR experience has a predefined virtual play area, the users' available virtual play areas may be fit into the predefined virtual play area. In this circumstance, the predefined virtual play area might comprise an outer boundary of areas within which the users' available virtual play areas may fit. Such fitting may be jigsaw-like, in that different users might be assigned different portions of the predefined virtual play area. As a simplified example, if the predefined virtual play area is a square and the users' available virtual play areas are triangles, then the triangles may be resized and/or otherwise scaled to be equal triangular halves of the square. Fitting the available virtual play areas into the predefined virtual play area may comprise fitting the available virtual play areas such that they do not overlap. In such a circumstance, each user of each XR device may have a separate area of the predefined virtual play area.

Fitting the users' available virtual play areas into the predefined virtual play area may comprise resizing and/or otherwise scaling the users' available virtual play areas. For example, users' available virtual play areas may be resized to fit the scale of the predefined virtual play area such that, for example, one step by a first user might take up more virtual distance than a second step by a second user. Such resizing and/or scaling may additionally and/or alternatively be performed with respect to the predefined virtual play area as well. For example, the predefined virtual play area might be resized based on the users' available virtual play area such that all users have a consistent experience.

Fitting the users' available virtual play areas into the predefined virtual play area need not require using all of the users' available virtual play areas. It might not be possible to perfectly fit all available virtual play areas into the predefined virtual play area, whether or not those available virtual play areas overlap. In such a circumstance, the available virtual play areas may be reshaped such that, for example, portions of a user's available virtual play area might go unused.

In step 726, it is determined whether the virtual play area has been determined. In certain circumstances, the particular combination of factors (e.g., the shape/size of available virtual play areas for different users, user location preferences, user role preferences) might make it prohibitively difficult to generate a virtual play area in step 724 or step 725. In those circumstances, a virtual play area might not be determined. If a virtual play area has not been determined, the flow chart may proceed to step 727. Otherwise, the flow chart may proceed to step 728.

In step 727, based on determining that the virtual play area has not been determined, one or more play area settings may be reconfigured. For example, reconfiguring the one or more parameters of a play area may comprise reshaping one or more available virtual play areas for one or more users, selecting different user roles, scaling a predefined virtual play area, or the like. The flow chart may then proceed back to step 722, where user role(s) might be redetermined, and it might again be attempted to determine the virtual play area.

In step 728, based on determining that the virtual play area has been determined, starting locations may be determined. The starting locations may be based on the user role preferences, the user location preferences, and/or other considerations. For example, the starting locations for the users may be configured such that the users start in roughly the same area of the virtual play area. As another example, the starting locations may be based on the role of a user, such that a sniper begins on the top of a virtual hill, whereas a brawler begins in a virtual alleyway.

FIG. 7C shows a third portion of a flowchart for providing a multiplayer XR experience. In particular, FIG. 7C continues from after step 728, and continues with step 729.

In step 729, one or more XR environments may be provided to the one or more users. Providing the XR environment might comprise rendering, in whole or in part, the XR environment. For example, providing the XR environment might comprise the on-board computing device 304 and/or the support computing devices 301 performing processing steps which result in the display devices 303a showing all or portions of the XR environment. Providing the XR environment to the one or more users may comprise sending virtual map positioning data to one or more XR devices. The virtual map positioning data might be different for each XR device. For example, each XR device might receive different map positioning data, each indicating a different starting point (and, in turn, a different perspective of a group XR experience). The virtual map positioning data might comprise, for example, information about a virtual play area for a user. For example, the virtual map positioning data may comprise boundary data that indicates a boundary of a virtual play area. Such a boundary might be represented by a virtual wall in a XR environment.

The XR environments may be based on the virtual play area determined in step 724 and/or step 725. The perspective of the XR environment provided may be based on the starting locations determined in step 728. For example, a first user may be provided a perspective of an XR environment based on the starting location determined in step 728. If corresponding virtual objects were determined in step 705, they may be displayed as part of step 729. If display rules were determined in step 707, they may be implemented as part of step 729 to, e.g., obscure physical object(s). If a virtual object has been configured for interaction (as described in step 709), the user may be capable of such interactions as part of step 729. If a notification has been determined as part of step 711, causing display of the notification in step 711 may comprise causing the notification to be displayed as part of the XR environment provided in step 729.

Not all portions of the XR environment need be the same for all users. Some users might be capable of seeing portions of the XR environment (e.g., user interface elements, virtual objects) which other users cannot. For example, the virtual door 406c might appear to some users as a locked door, whereas it might appear to other users as an unlocked door. As another example, the recognized couch 604a might be portrayed as a virtual couch for a user having a couch in that location in their physical environment, whereas the recognized couch 604a might be portrayed as partially transparent and unusable to other users.

In step 730, it may be determined whether there has been a change to the physical environment of one or more users. Such a change may be a change to a location of an object, such as was depicted with respect to FIG. 5A and FIG. 5B. Changes to physical objects might be detected using sensors, such as the cameras 303d, the speakers/microphones 303b, and/or the network interface 303f of FIG. 3. For example, the cameras 303d might detect that a door has been opened, the microphones of the speakers/microphones 303b might detect that a stove has been turned on, and/or the XR device 302 might receive, via the network interface 303f and from an Internet-connected appliance, an indication that the appliance is running. The change to the physical environment might additionally and/or alternatively relate to the size or shape of an object, the presence of other users in the physical environment, or the like. Such changes might relate to the safety of an object. For example, if a user is in a studio apartment and if their stove is turned on by a roommate, the cameras 303d and/or the microphones of the speakers/microphones 303b might detect that the stove has been turned on (e.g., via an infrared thermal imaging camera, and/or by detecting the sound of a stove ignition), and the XR device 302 might determine that the stove is likely dangerous. If a change has been detected to the physical environment, the flow chart may proceed to step 731. Otherwise, the flow chart proceeds to step 732.

In step 731, the XR environment(s) may be modified based on the change. If a physical object has been moved in a physical environment, then a virtual object may be moved in a complementary manner. If an object has become dangerous (e.g., if a stove has been turned on, as is described in the example above), then a corresponding virtual object might be indicated as dangerous (e.g., the virtual object might be depicted as being on fire). Additionally and/or alternatively, either or both step 724 and/or step 725 may be repeated. For example, responsive to a change in one or more of the physical environments, steps 717-718 and 725 may repeated, such that the newly-modified available virtual play areas (e.g., that reflect the change to the one or more physical environments) may be re-fit into the predefined virtual play area. New virtual map positioning data, reflecting the change, might then be sent to one or more of the XR devices.

In step 732, it may be determined whether connected objects may be modified. A connected object might be any object which may be controlled, in whole or in part, as part of providing the XR environment. For example, an Internet-connected thermostat might be a connected object in that, via the Internet, the temperature of a room might be modified to improve the immersion of an XR experience. The determination of whether to modify one or more connected objects might be based on activity in an XR experience. For example, if the XR experience is meant to be cold, then a thermostat might be instructed to make a room colder. If the connected objects are to be modified, the flow chart may proceed to step 733. Otherwise, the flow chart may proceed to step 734.

In step 733, modification of one or more connected objects might be caused. Modification of the one or more connected objects might comprise transmitting, via the Internet, instructions to an Internet-enabled device. As connected devices might vary in terms of their security, availability, and/or format, a database of connected devices may be queried to determine the particular type and format of instructions to transmit. For example, a database may be configured to store a plurality of templates for transmitting instructions to different brands of Internet-connected thermostats. This process might allow the XR device 302 to control one or more Internet-connected devices. For example, to cause an Internet-connected thermostat to become colder (to emulate a cold environment), the on-board computing device 304 may query a database to determine an instruction format for the thermostat. If needed, the on-board computing device 304 may additionally and/or alternatively determine an address of the thermostat, such as an IP address of the thermostat, by querying a local router or network device for that information. Based on the format, the on-board computing device 304 may transmit, over a network (e.g., a wireless local area network), the instructions to the thermostat In step 734, it may be determined whether to end presentation of the XR environment. Ending the presentation of the XR environment may be on a user-by-user basis and may be based on, for example, a user completing a task, a user asking to quit the game, or similar events. If presentation of the environment is not to be ended, the flow chart loops back to step 729. Otherwise, the flow chart ends.

Discussion will now turn to how roles might be assigned to users, and in particular how the available virtual play area of users might affect which roles might be available to users.

FIG. 8A shows a chart for assigning user roles, and shows how users with different room sizes and play styles might be assigned different roles. In particular, the available virtual play area size column 802a indicates the size of a user's available virtual play area (e.g., as determined in step 718 of FIG. 7B), the seated or standing column 802b indicates whether a user is seated or standing, the motion controls column 802c indicates whether a user is using motion controls, and the selected role column 803 indicates which role a user selected. The table indicates that a first user 801a, having a room size of 2 m², standing, and having motion controls, has been assigned the soldier role. The table indicates that a second user 801b, having a room size of 1 m², standing, and not having motion controls, has been assigned the engineer role. The table indicates that a third user 801c, having a room size of 0.5 m², seated, and having motion controls, has been assigned the sniper role.

As described with respect to step 719 of FIG. 7B and throughout FIGS. 7A-7C, users might be assigned different roles in an XR experience, and those roles might have particular requirements. The assigned role column 803a indicates that different users might be provided different roles based on how those users might have different available virtual play areas, and might reflect the decision-making of step 722 of FIG. 7B. Different and/or additional considerations may be taken into account. For example, user role preferences (e.g., as determined as part of step 719) might be taken into account. As another example, user location preferences (e.g., as determined as part of step 720) may be taken into account. The roles available, as well as the nature of the roles assigned, may be based on the XR environment parameters (e.g., as determined as part of step 713). All or portions of the data shown in FIG. 8A may be all or portions of the user data determined in step 712.

FIG. 8B shows requirements for different user roles. A minimum area size column 805a indicates a minimum available virtual play area which a user must have to adopt a role. A seated column 805b indicates whether the user may participate in the role when seated. A standing column 805c indicates whether the user may participate in the role when standing. A motion controls required column 805d indicates whether motion controls are required. Requirements for roles, such as those depicted in FIG. 8B, might be used to aid in the determination of roles for one or more users. For example, the requirements for roles depicted in FIG. 8B might be used as part of step 722 of FIG. 7B.

Requirements for roles, such as those depicted in FIG. 8B, might be expressed as a threshold (e.g., a minimum room size, a maximum room size), a range (e.g., a range of room sizes), a Boolean value (e.g., whether the user is seated), or the like. The requirements might also be subjective, and relate to, for example, a level of activity of the role (e.g., very active, largely passive), a complexity of the role (e.g., very complex, kid-friendly), or the like. The requirements might be mandatory (e.g., such that a user must satisfy the requirement to be assigned the role) and/or may be recommended (e.g., such that a user might not satisfy the requirement, but might be nonetheless assigned the role).

Discussion will now turn to various examples of menus which permit users to influence the decision-making processes described in FIGS. 7A-7B. These menus are illustrative and provide examples of how user preferences might influence both the assignment of roles and the use of physical objects in XR experiences.

FIG. 9A shows a menu for selecting a user role. Users might be provided a menu 901 for selecting a role, particularly when multiple roles might be available to a user. The menu 901 might be presented to the user as part of determining the user role preferences in step 719. As shown by text 902, the user is prompted, by the menu 901, to select a role. The role is based on various properties of their available virtual play area: namely, that it is a 2 m² room with a chair and a desk. A first option 903a allows a user to select a solider role, which is a standing role. A second option 903b allows a user to select an engineer role, which is a standing role that requires the user to move the chair in their room. A third option 903c is a commander role, which is a seated role.

Though the menu 901 suggests that a user gets a definitive choice in their role, the menu 901 might only be one consideration in whether a user gets a role. For example, should the user select the second option 903b but not move their chair, the user might be forced to select another role. As another example, should multiple users try to select the first option 903a, then some of those users might be forced to select another role to diversity the XR experience.

In some instances, more users might request a role than may be assigned that role. For example, if only two users can be assigned a soldier role but five users request the role, then three of those users might be assigned other roles. The decision regarding which user gets a requested role might depend on the physical environment of a user. For example, returning to the above example where five users request the soldier role with only two slots, if the soldier role requires a large physical environment, then the two users with the largest physical environments might be prioritized over other users. The decision regarding which user gets a requested role might additionally and/or alternatively based on their user preferences (e.g., how strongly they prioritize roles like the soldier role), their past use of the XR environment (e.g., a player that has never tried the soldier role might be prioritized over other users so that they might enjoy it for the first time), or the like.

FIG. 9B shows a menu 904 for using objects in a physical environment. As the text 905 indicates, the menu 904 allows a user to select whether physical objects in their room might be used as part of gameplay. A first option 906a allows a user to decide that a couch, in their physical environment, may be used during gameplay. A second option 906b allows a user to decide that the couch should not be used. Selection of the second option 906b might limit the user to certain roles, such as standing roles.

The menu 904 of FIG. 9B might be used as portions of step 708 of FIG. 7A. For example, as part of determining whether a user may interact with an object, it may be determined (using, e.g., the menu 904) whether the user permits the object to be used. In this manner, a user might prevent certain objects (e.g., an expensive and/or unstable chair) from being used in gameplay if desired.

Figure 10A:
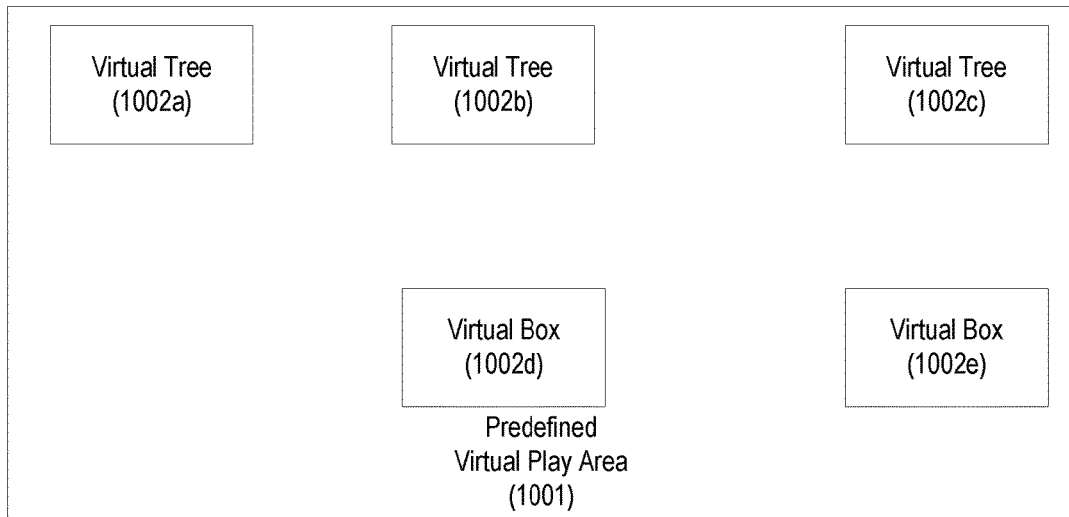
FIG. 10A shows an example predefined virtual play area.
Figure 10B:
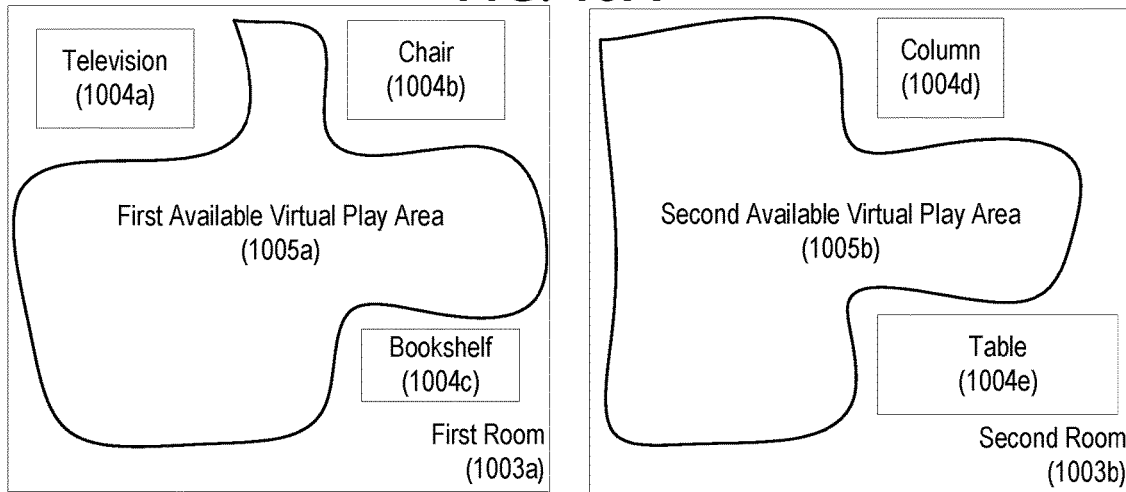
FIG. 10B shows different user play areas.
Figure 10C:
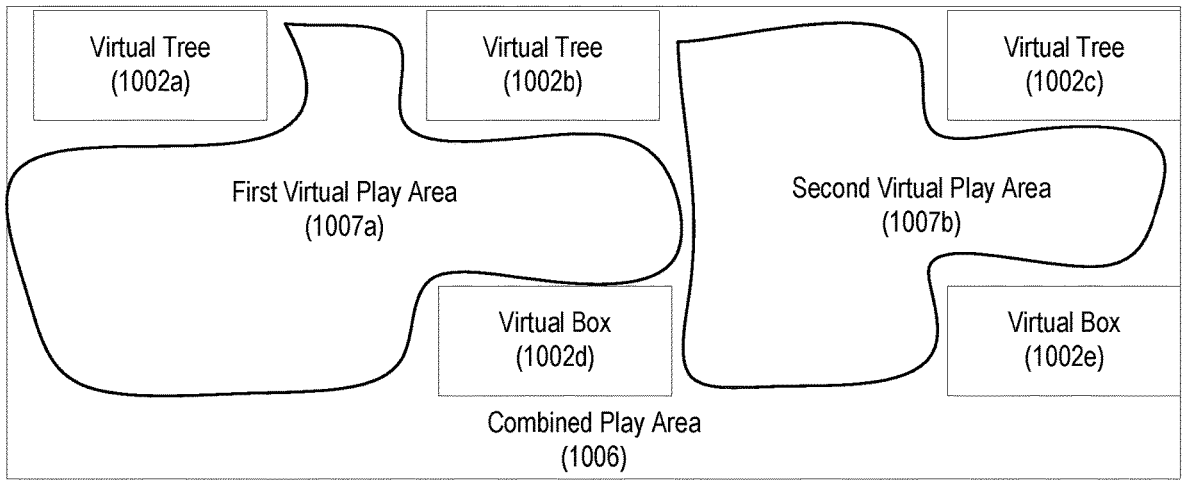
FIG. 10C shows the different available virtual play areas of FIG. 10B fit into the predefined virtual play area of FIG. 10A to form a combined play area.

Discussion will now return to fitting users' available virtual play areas into a predefined virtual play area, as discussed above with respect to step 725 of FIG. 7B. FIGS. 10A-10C show how such a fitting process might occur.

FIG. 10A shows a predefined virtual play area 1001 comprising five virtual objects: a first virtual tree 1002a, a second virtual tree 1002b, a third virtual tree 1002c, a first virtual box 1002d, and a second virtual box 1002e. The predefined virtual play area 1001 is illustrative of a play area which might be defined for an XR experience. For example, the predefined virtual play area 1001 may be a map that has been designed by a game designer as part of a video game.

FIG. 10B shows a first room 1003a and a second room 1003b, which correspond to two different users. The first room 1003a comprises three objects: a television 1004a, a chair 1004b, and a bookshelf 1004c. The area where a user might move around those objects is defined as a first available virtual play area 1005a. The second room 1003b comprises two objects: a column 1004d and a table 1004e. The area where a user might move around those objects is defined as a second available virtual play area 1005b. The first available virtual play area 1005a and/or the second available virtual play area 1005b might have been determined as part of step 718 of FIG. 7B.

FIG. 10C shows the different available virtual play areas of FIG. 10B fit into the predefined virtual play area 1001 of FIG. 10A to form a combined play area 1006. The five virtual objects from FIG. 10A are present in FIG. 10c, but the play areas for the first user and the second user have been inserted into the combined play area 1006. In the example shown in FIG. 10C, the first virtual play area 1007a and the second virtual play area 1007b do not overlap, such that each user has their own play area. Additionally and/or alternatively, the areas might wholly or partially overlap.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   receiving information indicating a plurality of extended reality (XR) devices associated with a group XR experience;
   determining, based on a physical layout of an environment associated with each of the plurality of XR devices, an available virtual play area associated with each of the plurality of XR devices;
   determining, based on the available virtual play area associated with each of the plurality of XR devices, a combined virtual play area for the group XR experience, wherein at least a portion of the combined virtual play area is accessible via a subset of the plurality of XR devices; and
   causing, based on the combined virtual play area, the XR devices to provide the group XR experience.

2. The method of claim 1, wherein determining the combined virtual play area for the group XR experience comprises:
   fitting the available virtual play area associated with each of the plurality of XR devices into different areas of a virtual map such that each user of the plurality of XR devices is limited to a different one of the different areas of the virtual map.

3. The method of claim 1, further comprising:
   determining, based on a location of one or more physical objects in a first environment associated with a first XR device of the plurality of XR devices and a shape of a first play area associated with the first XR device, a starting location for the first XR device.

4. The method of claim 1, further comprising:
   detecting a change to a shape of a first environment associated with a first XR device of the plurality of XR devices; and
   determining, based on the change to the shape, a new combined virtual play area for the group XR experience.

5. The method of claim 1, wherein determining the combined virtual play area for the group XR experience comprises:
   resizing, based on a difference in scale between a first available virtual play area of a first XR device of the plurality of XR devices and a second available virtual play area of a second XR device of the plurality of XR devices, at least a portion of a virtual map.

6. The method of claim 1, further comprising:
   receiving user input indicating a role for a user of one of the plurality of XR devices, wherein determining the combined virtual play area for the group XR experience is based on the role.

7. The method of claim 1, wherein determining the combined virtual play area for the group XR experience is based on a physical environment preference for a first XR device of the plurality of XR devices.

8. A method comprising:
   receiving information indicating a plurality of extended reality (XR) devices associated with a group XR experience;
   determining, based on a physical layout of an environment associated with each of the plurality of XR devices, an available virtual play area associated with each of the plurality of XR devices;
   determining, based on the available virtual play area associated with each of the plurality of XR devices, a combined virtual play area for the group XR experience, wherein at least a portion of the combined virtual play area is accessible via a subset of the plurality of XR devices, and wherein determining the combined virtual play area for the group XR experience comprises:
      determining a shape of a first play area associated with a first XR device of the plurality of XR devices; and
      determining, based on the shape of the first play area, the combined virtual play area, and
   causing, based on the combined virtual play area, the XR devices to provide the group XR experience.

9. The method of claim 8, further comprising:
receiving role preference information indicating different role preferences, associated with different XR devices of the plurality of XR devices, for the group XR experience; and
assigning, to each of the plurality of XR devices and based on the role preference information, a different portion of the combined virtual play area.

10. The method of claim 8, wherein at least a portion of the combined virtual play area is inaccessible to a user of the first XR device based on the shape of the first play area.

11. The method of claim 8, further comprising:
determining a second shape of a second play area associated with a second XR device of the plurality of XR devices, wherein the determining the combined virtual play area is based on an intersection of the shape and the second shape.

12. The method of claim 8, wherein the determining the combined virtual play area comprises limiting the first play area of the first XR device of the plurality of XR devices based on a second play area of a second XR device of the plurality of XR devices.

13. The method of claim 8, wherein determining the combined virtual play area for the group XR experience comprises:
fitting, based on the shape of the first play area, the first play area into a virtual map such that a user of the first XR device is limited to a portion of the virtual map.

14. The method of claim 8, further comprising:
determining, based on a current location of a user of the first XR device and the shape of the first play area associated with the first XR device, a starting location for the first XR device.

15. The method of claim 8, further comprising:
detecting a change to a first environment associated with the first XR device;
determining, based on the change, a new shape of the first play area; and
determining, based on the new shape of the first play area, a new combined virtual play area for the group XR experience.

16. The method of claim 8, wherein determining the combined virtual play area for the group XR experience comprises:
resizing, based on a difference in scale between a first available virtual play area of the first XR device and a second available virtual play area of a second XR device, at least a portion of the combined virtual play area.

17. The method of claim 8, further comprising:
receiving user input indicating a role for a user of one of the plurality of XR devices, wherein determining the combined virtual play area for the group XR experience is based on a quantity of space required for the role.

18. The method of claim 8, wherein determining the combined virtual play area for the group XR experience is based on a physical environment preference for the first XR device of the plurality of XR devices.

19. A method comprising:
receiving information indicating a plurality of extended reality (XR) devices associated with a group XR experience;
determining, based on a physical layout of an environment associated with each of the plurality of XR devices, an available virtual play area associated with each of the plurality of XR devices;
determining, based on the available virtual play area associated with each of the plurality of XR devices, a combined virtual play area for the group XR experience, wherein, in the combined virtual play area, a first available virtual play area of a first XR device of the plurality of XR devices is limited based on a second available virtual play area of a second XR device of the plurality of XR devices; and
causing, based on the combined virtual play area, the XR devices to provide the group XR experience.

20. The method of claim 19, wherein determining the combined virtual play area comprises determining an overlap between:
the first available virtual play area; and
the second available virtual play area.

21. The method of claim 19, wherein determining the combined virtual play area comprises:
causing display, in the group XR experience, of a virtual object that prevents access, by the first XR device, to least a portion of the combined virtual play area.

22. The method of claim 19, further comprising:
receiving user input indicating a role for a user of one of the plurality of XR devices, wherein determining the combined virtual play area is based on a quantity of space required for the role.

23. The method of claim 19, further comprising:
determining, based on a first location of one or more physical objects in a first environment associated with the first XR device of the plurality of XR devices, a second location for a virtual object, wherein the group XR experience is configured to display the virtual object in the second location.

24. The method of claim 19, further comprising:
determining, based on a location of one or more physical objects in a first environment associated with the first XR device of the plurality of XR devices, a starting location, wherein determining the combined virtual play area is based on the starting location.

25. A method comprising:
receiving data indicating a plurality of extended reality (XR) devices associated with a group XR experience;
determining, based on a physical layout of an environment associated with each of the plurality of XR devices, an available virtual play area associated with each of the plurality of XR devices;
determining, based on the available virtual play area associated with each of the plurality of XR devices, a role for each of the plurality of XR devices;
determining, based on the role for each of the plurality of XR devices, a combined virtual play area for the group XR experience; and
causing, based on the combined virtual play area, the XR devices to provide the group XR experience.

26. The method of claim 25, wherein determining the role for each of the plurality of XR devices comprises:
determining a first physical layout of a first environment associated with a first XR device of the plurality of XR devices;
causing display, based on the first physical layout, of a plurality of role options; and
receiving user input indicating a selection of at least one of the plurality of role options.

27. The method of claim 25, wherein determining the role for each of the plurality of XR devices comprises:
determining movement preference information associated with a first XR device of the plurality of XR devices.

28. The method of claim 25, wherein determining the role for each of the plurality of XR devices comprises:
   determining a starting location for a first XR device of the plurality of XR devices.

29. The method of claim 25, wherein the determining the combined virtual play area for the group XR experience is based on a quantity of play area required for each role of the plurality of XR devices.

* * * * *

UNITED STATES PATENT AND TRADEMARK OFFICE
CERTIFICATE OF CORRECTION

| | |
|---|---|
| PATENT NO. | : 11,720,165 B2 |
| APPLICATION NO. | : 17/212017 |
| DATED | : August 8, 2023 |
| INVENTOR(S) | : Chen |

It is certified that error appears in the above-identified patent and that said Letters Patent is hereby corrected as shown below:

In the Drawings

Sheet 10 of 13, FIG. 7C:
Delete "FROM FIG. 7C" and insert --FROM FIG. 7B-- therefor In the Specification Column 6, Detailed Description, Line 2:
Delete "110)" and insert --210)-- therefor Column 29, Detailed Description, Line 48:
Delete "803$a$" and insert --803-- therefor In the Claims Column 34, Claim 21, Line 21:
Before "least", insert --at-- therefor Signed and Sealed this
Eighth Day of October, 2024

Katherine Kelly Vidal
*Director of the United States Patent and Trademark Office*